(12) United States Patent
Takaishi

(10) Patent No.: US 7,570,452 B2
(45) Date of Patent: Aug. 4, 2009

(54) TWO DEGREE OF FREEDOM POSITION CONTROL METHOD, TWO DEGREE OF FREEDOM POSITION CONTROL DEVICE, AND MEDIUM STORAGE DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 15 days.

(21) Appl. No.: 11/732,459

(22) Filed: Apr. 3, 2007

(65) Prior Publication Data

US 2008/0080088 A1      Apr. 3, 2008

(30) Foreign Application Priority Data

Sep. 28, 2006   (JP) .............................. 2006-265472

(51) Int. Cl.
*G11B 5/596* (2006.01)
*G05B 11/01* (2006.01)

(52) U.S. Cl. ................... 360/78.06; 360/78.09; 318/560

(58) Field of Classification Search ....................... None
See application file for complete search history.

(56) References Cited

U.S. PATENT DOCUMENTS

| | | | |
|---|---|---|---|
| 5,880,953 A | | 3/1999 | Takeuchi et al. |
| 6,153,997 A | * | 11/2000 | Kobayashi et al. ........... 318/560 |
| 6,545,838 B1 | * | 4/2003 | Burton ..................... 360/78.06 |
| 6,646,824 B1 | | 11/2003 | Takaishi et al. |
| 2002/0159187 A1 | * | 10/2002 | Kagami et al. ........... 360/78.09 |
| 2004/0240102 A1 | | 12/2004 | Atsumi et al. |
| 2005/0207057 A1 | | 9/2005 | Atsumi |

FOREIGN PATENT DOCUMENTS

| | | |
|---|---|---|
| EP | 0 774 754 | 5/1997 |
| JP | 2001-184817 | 7/2001 |
| JP | 3229204 | 9/2001 |

OTHER PUBLICATIONS

Fujimoto et al., "Proposal of Seeking Control of Hard Disk Drives Based on Perfect Tracking Control using Multirate Feedforward Control," IEEE, 2000, pp. 74-79.

* cited by examiner

*Primary Examiner*—Jason C Olson
(74) *Attorney, Agent, or Firm*—Greer, Burns & Crain, Ltd.

(57) ABSTRACT

In a position control device based on a current observer control for performing two degree of freedom control, calculation accuracy is improved using a fixed point processor. For a target position trajectory and position error, which are inputs of a two degree of freedom control system using an observer, relative values of which reference is the reference trajectory are used, so that the state variable of the observer can hold a relative distance from the reference position. Compared with the case of holding an absolute distance, a range where the value changes is smaller, and the number of effective digits of a decimal point can be increased, and calculation accuracy can be improved even if a fixed point method is used. As a consequence, control current becomes smooth and the generation of resonance and noise can be prevented in an acceleration period, and the generation of residual vibration can be prevented in a constant velocity period and deceleration period, and seek time can be decreased.

20 Claims, 13 Drawing Sheets

Servo Mark
Gray Code
Index
PosA PosB PosC PosD

FIG. 17 PRIOR ART
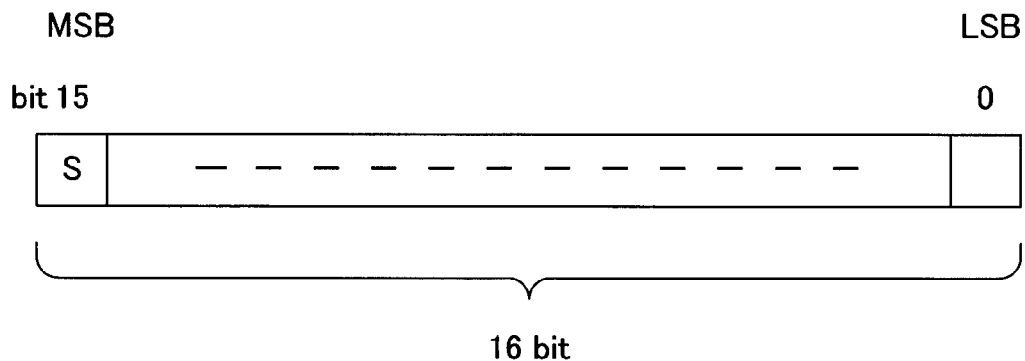
FIG. 18 PRIOR ART
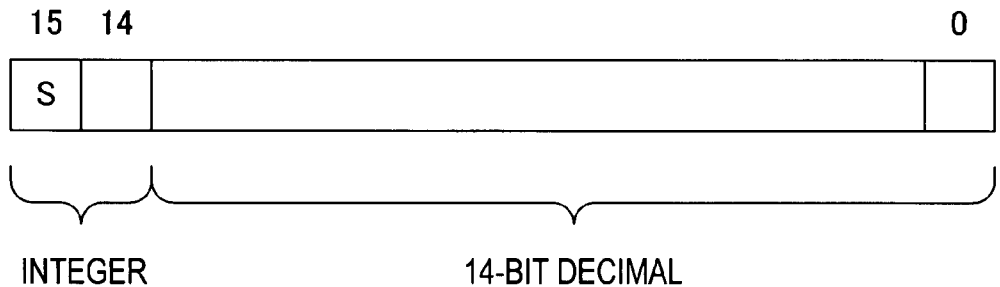
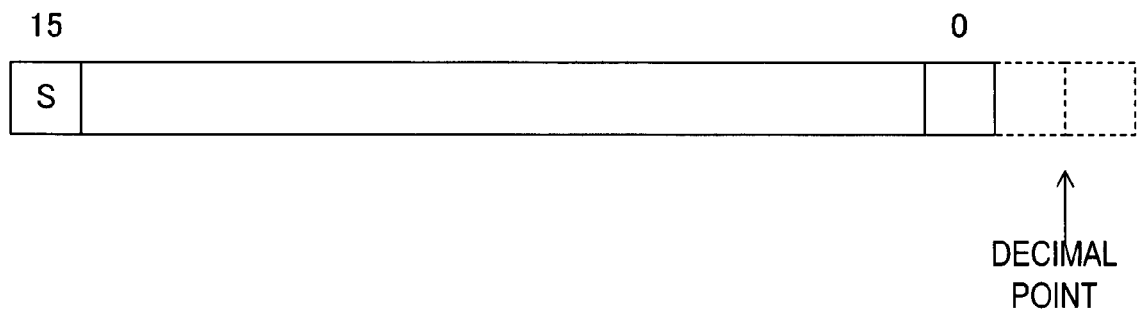

TWO DEGREE OF FREEDOM POSITION CONTROL METHOD, TWO DEGREE OF FREEDOM POSITION CONTROL DEVICE, AND MEDIUM STORAGE DEVICE

CROSS-REFERENCE TO RELATED APPLICATIONS

This application is based upon and claims the benefit of priority from the prior Japanese Patent Application No. 2006-265472, filed on Sep. 28, 2006, the entire contents of which are incorporated herein by reference.

BACKGROUND OF THE INVENTION

1. Field of the Invention

The present invention relates to a two degree of freedom position control method, two degree of freedom position control device and medium storage device using both feedback and feed forward, and more particularly to a two degree of freedom position control method, two degree of freedom position control device and medium storage device for performing two degree of freedom control using observer control.

2. Description of the Related Art

A device for controlling the position of an object to a target position is widely used. For example, this device is used for seek control for moving a head to a target track, which is one of the position controls of a disk device, such as a magnetic disk device and an optical disk device.

A method for this seek control is using two degree of freedom control. In the two degree of freedom control, a target position is provided via a filter while forming a feedback loop. In other words, the transfer function from a target position to an observation position is set to be a form of a low pass filter. By this, overshoot (overrun) can be suppressed effectively.

In the observer control system which is generally used for disk devices as well, a two degree of freedom control system can be constructed. In this case, the control system has a form of a second degree low pass filter (hereafter called LPF), which has a same pole as the feedback pole. FIG. 15 is a block diagram of a two degree of freedom control system of a prior art, and FIG. 16 is a diagram depicting a target trajectory.

As FIG. 15 shows, a target trajectory generation section 100 calculates a seek distance from a target position 'r', and generates a target trajectory r (n) according to a seek distance Lseek. As FIG. 16 shows, the target trajectory r (n) indicates a target position to which an object is moved for each sample. A position error computing section 102, on the other hand, computes an error y (n) between the target position 'r' and a current position 'y' observed from a plant 106. A controller 104 receives the target trajectory r (n) and the position error y (n), performs the computation of the two degree of freedom observer, calculates a drive command value of the plant 106, and drives the plant 106 (e.g. "Digital Control of Dynamic Systems", (by Gene F. Franklin and two others, published by Addison-Wesley, 1998)).

In this seek control using two degree of freedom control, it is necessary to maintain a position error for a state variable of an observer. On the other hand, the recording density of a medium storage device, represented by a magnetic disk device, is radically increasing recently. For example, in a 2.5 inch HDD (Hard Disk Drive), the capacity per disk has reached 60 GB. The number of tracks is also rapidly increasing accordingly, and a 2.5 inch HDD, for example, has 40 to 50 thousand tracks.

In such a device, a decrease in cost and the downsizing of the device are demanded. Therefore, not a floating point but a fixed point MCU (Microcontroller Unit) is used. In particular, a 16-bit computing unit is widely used.

As FIG. 17 shows, in the 16-bit fixed point method, sign bit 'S' is set in a most significant bit, and a number is represented by the remaining 15 bits. Since 16 bits represent only '−32768' to '+32678', it is impossible to represent a number such as the above mentioned 50,000 with a sign.

As a method to extend the number of digits in this fixed point method, a Q-format method is known. As FIG. 18 shows, in the case of the Q2-format, for example, the significant 2 bits are used for an integer, and the insignificant 14 bits are used for decimal. In the case of the Q-1-format, the position of a decimal point is set to minus 1 LSB (least Significant Bit), so as to extend the number of bits to represent a number to 16 bits. In this case, one bit above the decimal point cannot be represented.

If this conventional method of extending the number of digits is applied to the above mentioned two degree of freedom observer, the accuracy of an observed position and estimated position drops because the position of the decimal point is set to minus. For example, if the position of the decimal point is minus 1 LSB, then the insignificant 1 bit above the decimal point is rounded.

This deteriorates calculation accuracy, and the fluctuation of seek current in the position control increases, particularly in the acceleration period, and seek current does not flow smoothly, which causes resonance and noise. As the recording density further increases and the number of tracks increases in the future, this influence becomes progressively more serious.

SUMMARY OF THE INVENTION

With the foregoing in view, it is an object of the present invention to provide a two degree of freedom position control method, two degree of freedom position control device and medium storage device for improving calculation accuracy in the two degree of freedom control even if a fixed point type processor is used.

It is another object of the present invention to provide a two degree of freedom position control method, two degree of freedom position control device and medium storage device for implementing a smooth position control even if two degree of freedom control is performed using a fixed point type processor.

It is still another object of the present invention to provide a two degree of freedom position control method, two degree of freedom position control device, and medium storage device for preventing the generation of noise, even if two degree of freedom control is performed using a fixed point type processor.

It is still another object of the present invention to provide a two degree of freedom position control method, two degree of freedom position control device and medium storage device for implementing high precision position control using an inexpensive fixed point type processor.

To achieve these objects, a position control method for controlling a position of an object to a target position by an actuator, according to the present invention, has: a step of generating a target position trajectory to the target position; a step of computing a position error based on a target position of the object and a current position of the object; and a step of computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error.

A medium storage device according to the present invention, has: a head for at least reading data on a storage medium, an actuator for positioning the head to a predetermined position of the storage medium; and a control unit for generating a target position trajectory to the target position, computing a position error based on a target position of the object and a current position of the object, and computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error.

A position control device for controlling a position of an object to a target position by an actuator according to the present invention, has: a generation block for generating a target position trajectory to the target position; an error computing block for computing a position error based on a target position of the object and a current position of the object; and a control unit for computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error.

It is preferable that the present invention further has a step of correcting an estimated position held by the two degree of freedom control system which uses the observer into a relative value from the reference trajectory.

It is also preferable that the present invention further has a step of computing an output value to the actuator using the target position trajectory for the reference trajectory.

It is also preferable that the output value computing step further has a step of computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error, for each sample.

In the present invention, it is also preferable that the output value computing step further has a step of determining a relative value of a target position trajectory by subtracting a reference trajectory following up the target position trajectory from the target position trajectory, a step of determining a relative value of the position error by subtracting the reference trajectory from the position error, and a step of computing an output value to the actuator by a two degree of freedom control system which uses an observer, using the relative value of the target position trajectory and the relative value of the position error.

In the present invention, it is also preferable that the step of computing the position error further has a step of computing a position error between a current position acquired from an output of a head which at least reads data of a storage medium, and a target position for driving the actuator and moving the head to a predetermined position on the storage medium.

In the present invention, it is also preferable that the output value computing step further has a step of computing an output value to the actuator by a two degree of freedom control system which uses a multi-rate control observer, using a relative value of a first target position trajectory resulting when a reference trajectory followed up the target position trajectory is subtracted from the target position trajectory at a sample time, a relative value of a second target position trajectory resulting when the reference trajectory is subtracted from a target position trajectory at the sample time +0.5 sample time, and a relative value of a position error resulting when the reference trajectory is subtracted from the position error.

For an input of the two degree of freedom control system using an observer, a relative value is used and an absolute value does not have to be handled, so it is sufficient that a state variable of the observer holds a relative distance from a reference position, and a range where the value changes is smaller compared with the case of holding an absolute distance. Therefore the number of effective digits of a decimal point can be increased, and calculation accuracy can be improved even if a fixed point method is used. As a consequence, the control current becomes smooth, and the generation of resonance and noise can be prevented in an acceleration period, and the generation of residual vibration can be prevented in a constant velocity period and deceleration period, and seek time can be decreased.

BRIEF DESCRIPTION OF THE DRAWINGS

FIG. 17 is a diagram depicting a fixed point of a processor; and

FIG. 18 is a diagram depicting a Q-format of a fixed point method of a processor.

DESCRIPTION OF THE PREFERRED EMBODIMENTS

Embodiments of the present invention will now be described in the sequence of the medium storage device, first embodiment of the two degree of freedom position control system, two degree of freedom current observer, second embodiment, third embodiment, multi-rate control current observer, fourth embodiment, and other embodiments, but the present invention is not limited to these embodiments.

Medium Storage Device

Figure 1:
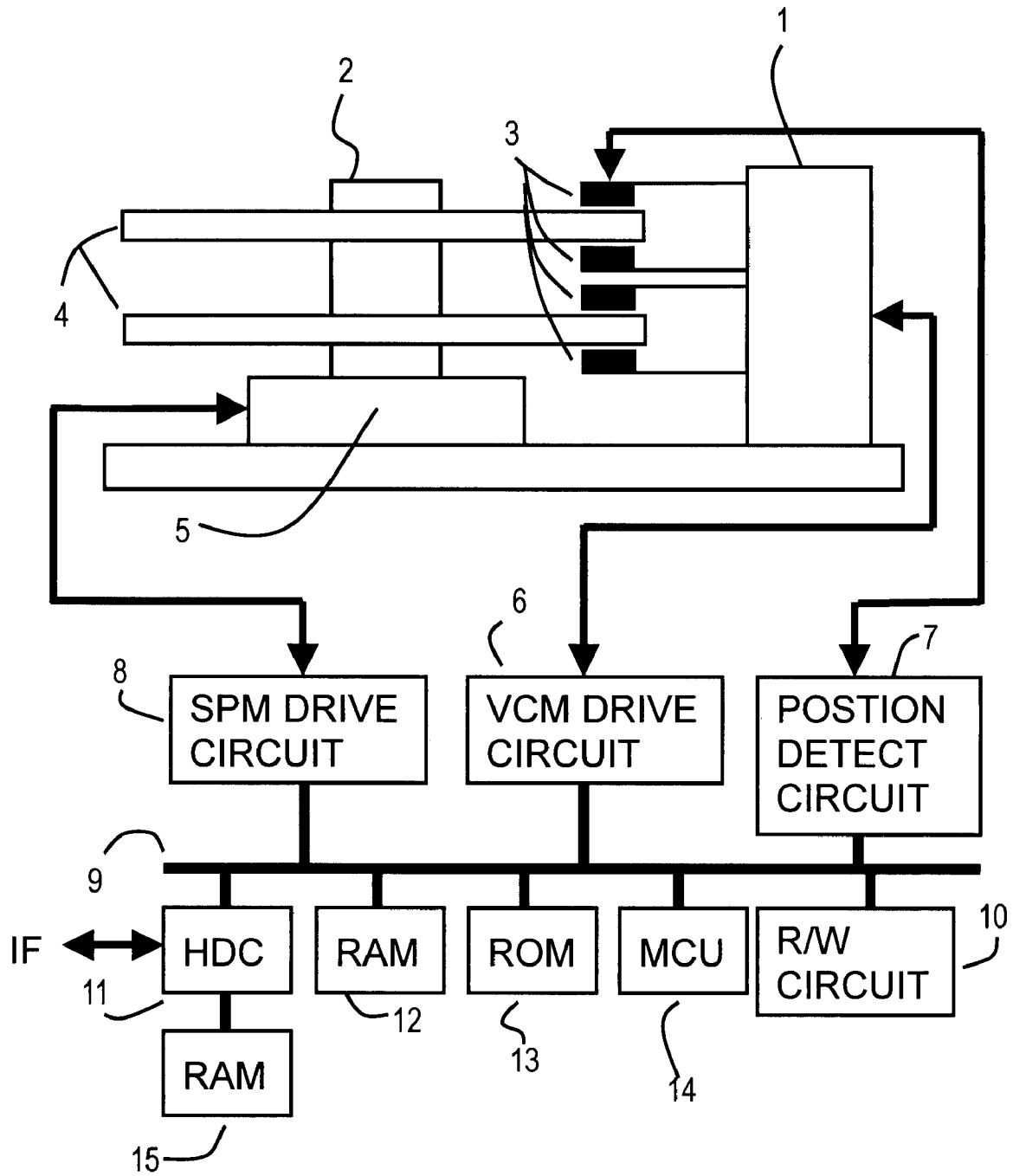
FIG. 1 is a block diagram depicting a medium storage device according to an embodiment of the present invention.
Figure 2:
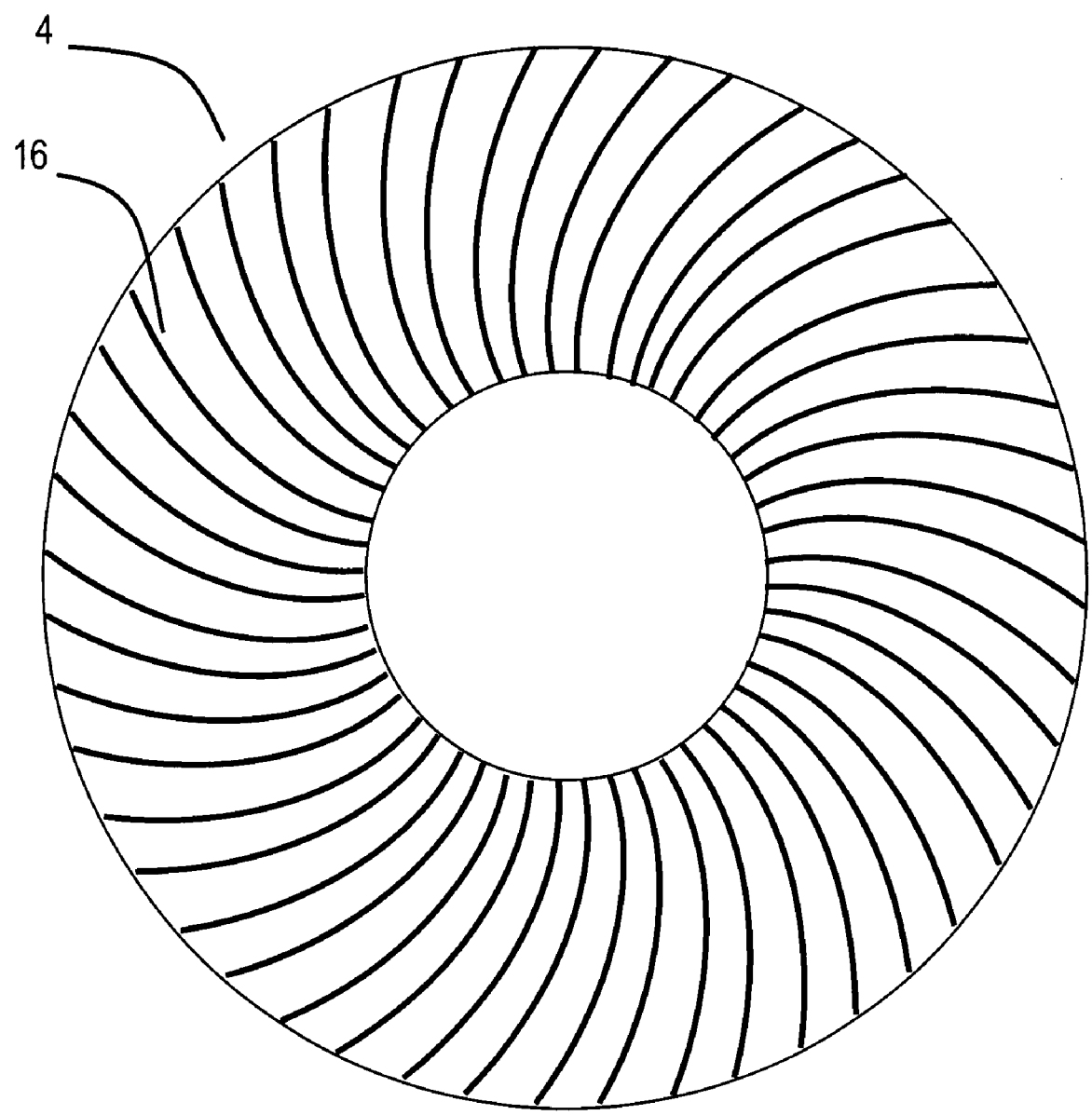
FIG. 2 is a diagram depicting the position signals of the disk in FIG. 1.
Figure 3:
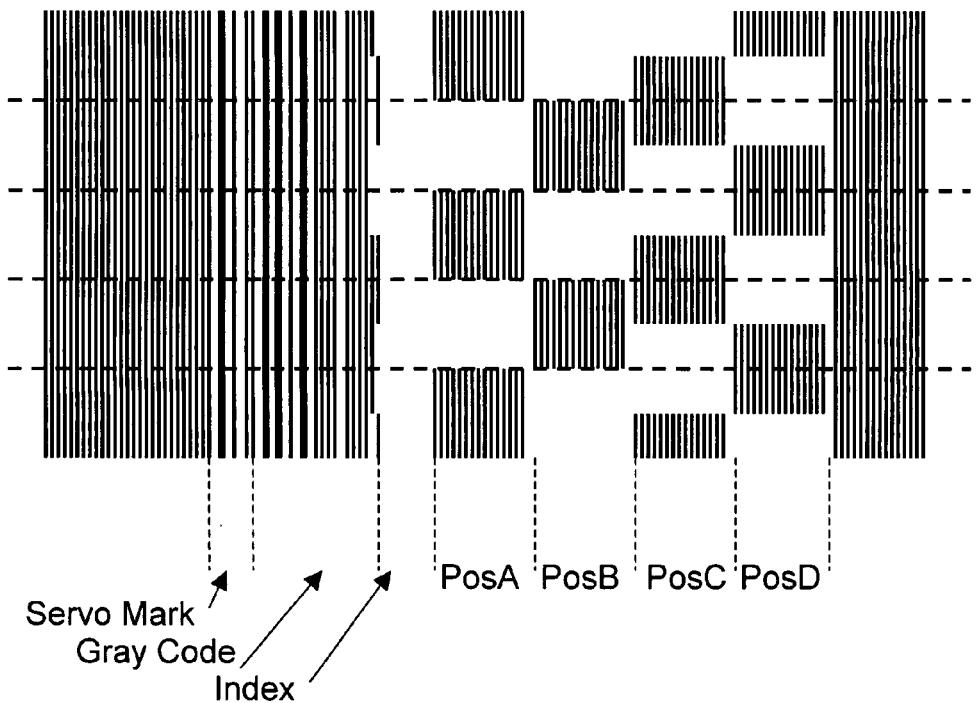
FIG. 3 is a diagram depicting details of the position signals in FIG. 2.
Figure 4:
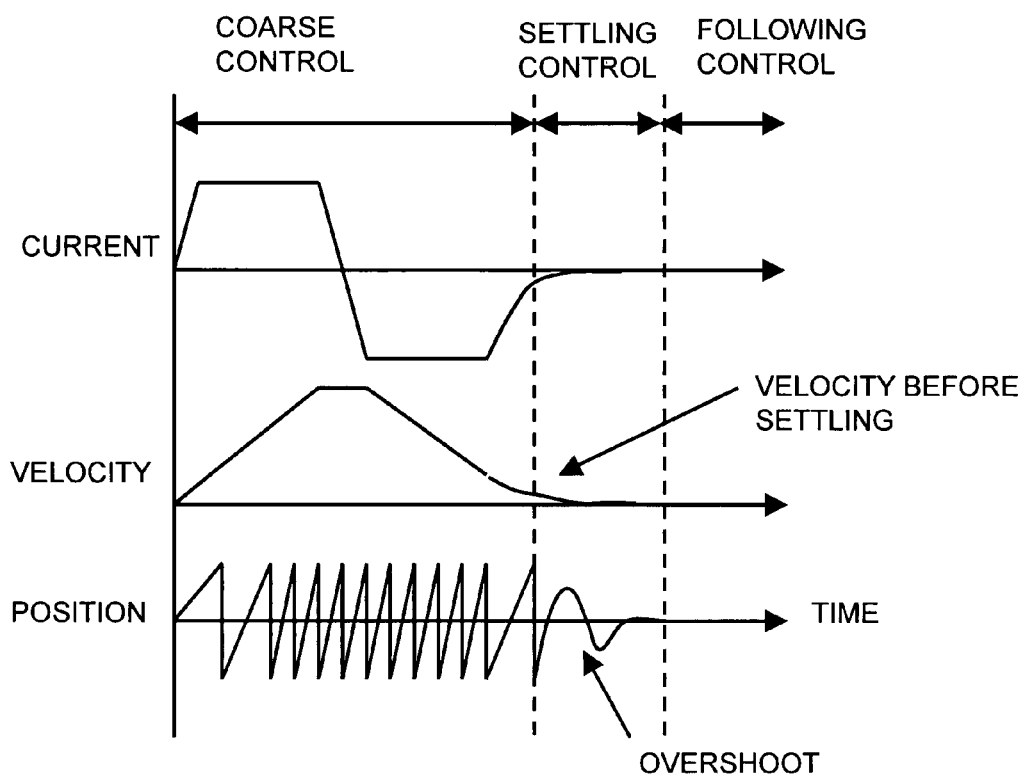
FIG. 4 is a diagram depicting the transition of the seek control according to an embodiment of the present invention.

FIG. 1 is a block diagram depicting a medium storage device according to an embodiment of the present invention, FIG. 2 is a diagram depicting the arrangement of the position signals of a magnetic disk in FIG. 1, FIG. 3 is a diagram depicting the position signals of the magnetic disk in FIG. 1 and FIG. 2, and FIG. 4 is a diagram depicting the control transition of seek control.

FIG. 1 shows a magnetic disk device as a medium storage device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3 at the tip, and moves the magnetic head 3 in the radius direction of the magnetic disk 4.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1.

The magnetic head 3 has a read element and a write element. The magnetic head 3 is comprised of a read element, including a magneto-resistance (MR) element, stacked on a slider, and a write element, including a write coil, stacked thereon.

A position detection circuit 7 converts the position signals (analog signals) read by the magnetic head 3 into digital signals. A read/write (R/W) circuit 10 controls the reading and writing of the magnetic head 3. A spindle motor (SPM) drive circuit 8 drives the spindle motor 5. A voice coil motor (VCM) drive circuit 6 supplies drive current to the voice coil motor (VCM) 1, and drives the VCM 1.

A microcontroller (MCU) 14 detects (demodulates) the current position from the digital position signals from the position detection circuit 7, and computes a VCM drive command value according to an error between the detected current position and a target position. In other words, the microcontroller 14 performs position demodulation and servo control (current observer control), including the disturbance suppression described in FIG. 5 and later. A read only memory (ROM) 13 stores the control programs of the MCU 14. A random access memory (RAM) 12 stores data for processing of the MCU 14.

A hard disk controller (HDC) 11 judges a position in one track based on a sector number of a servo signal, and records/reproduces the data. A random access memory (RAM) for buffer 15 temporarily stores the read data or write data. The HDC 11 communicates with a host via an interface IF, such as USB (Universal Serial Bus), ATA or SCSI (Small Computer System Interface). A bus 9 connects these composing elements.

As FIG. 2 shows, on the magnetic disk 4, servo signals (position signals) 16 are arrayed in each track in the circumference direction from the outer circumference to the inner circumference with an equal interval. Each track has a plurality of sectors, and the solid lines in FIG. 2 indicate positions where the servo signals 16 are recorded. As FIG. 3 shows, the position signal is comprised of a servo mark ServoMark, track number GrayCode, index Index, and offset information (servo burst) PosA, PosB, PosC and PosD. The dotted line in FIG. 3 shows the track center.

The position signals in FIG. 3 are read by the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is detected is set to No. 0, which is counted up every time the servo signal is detected, so as to acquire the sector number of each sector of the track. The sector number of the servo signal is used as a reference when data is recorded/reproduced. There is one index signal in one track. The sector number may be set instead of the index signal.

The MCU 14 in FIG. 1 confirms the position of the actuator 1 through the position detection circuit 7, performs servo computation, and supplies appropriate current to the VCM 1. In other words, as FIG. 4 shows, in seek control, the head is moved to the target position through the transition from coarse control, settling control and following control. For all of these controls, the current position of the head must be detected.

To confirm the position like this, the servo signals are recorded on the magnetic disk in advance, as mentioned in FIG. 2. In other words, FIG. 3 shows a servo mark which indicates the start position of the servo signal, gray code which indicates the track number, index signal, and signals PosA to PosD which indicate the offset. These signals are read by the magnetic head, and these servo signals are converted into digital values by the position detection circuit 7. The MCU 14 has a fixed point type processor (16 bits in this case).

First Embodiment of Two Degree Freedom Position Control System

Figure 5:
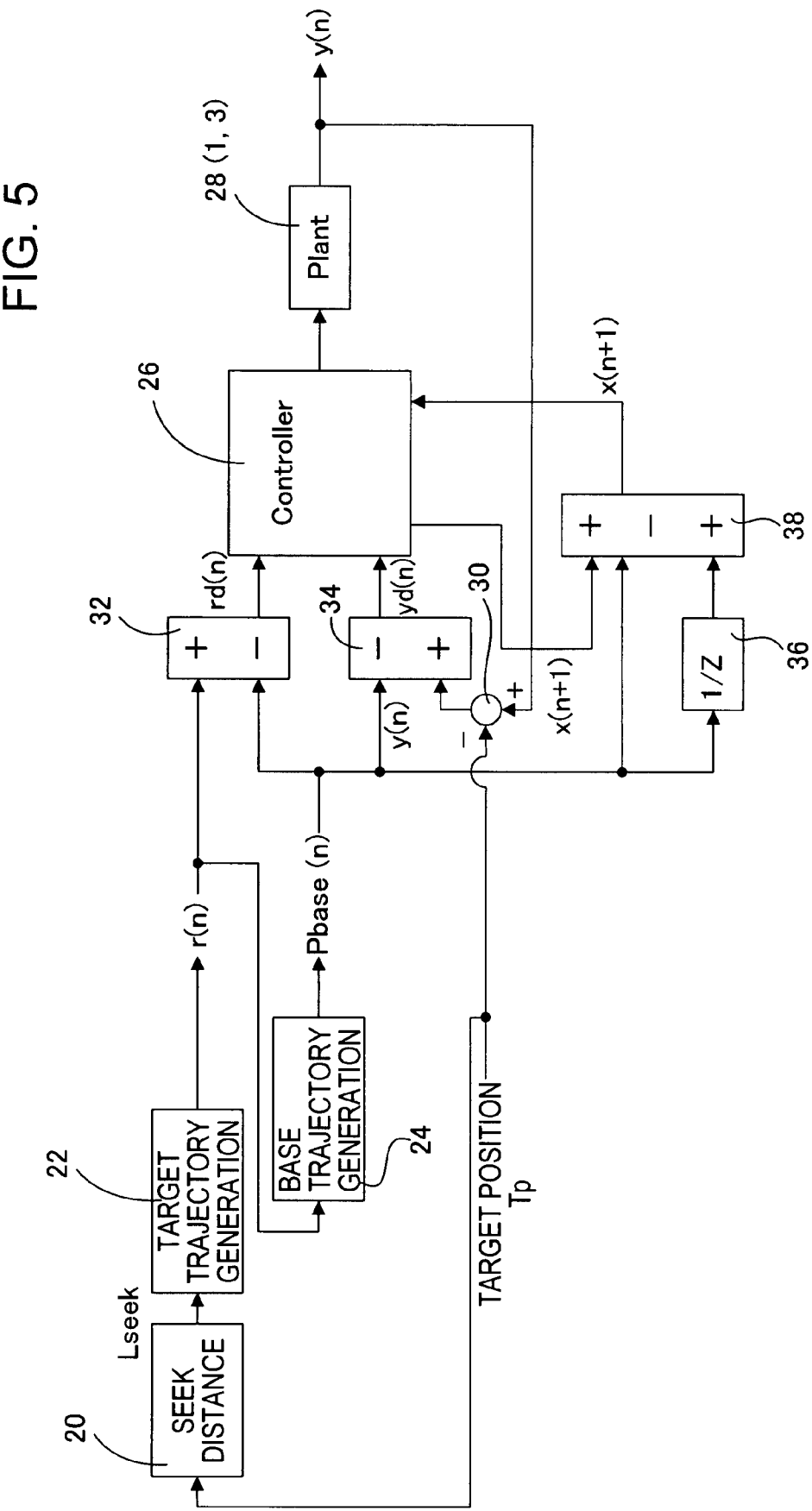
FIG. 5 is a block diagram depicting a two degree of freedom control system according to the first embodiment of the present invention.
Figure 6:
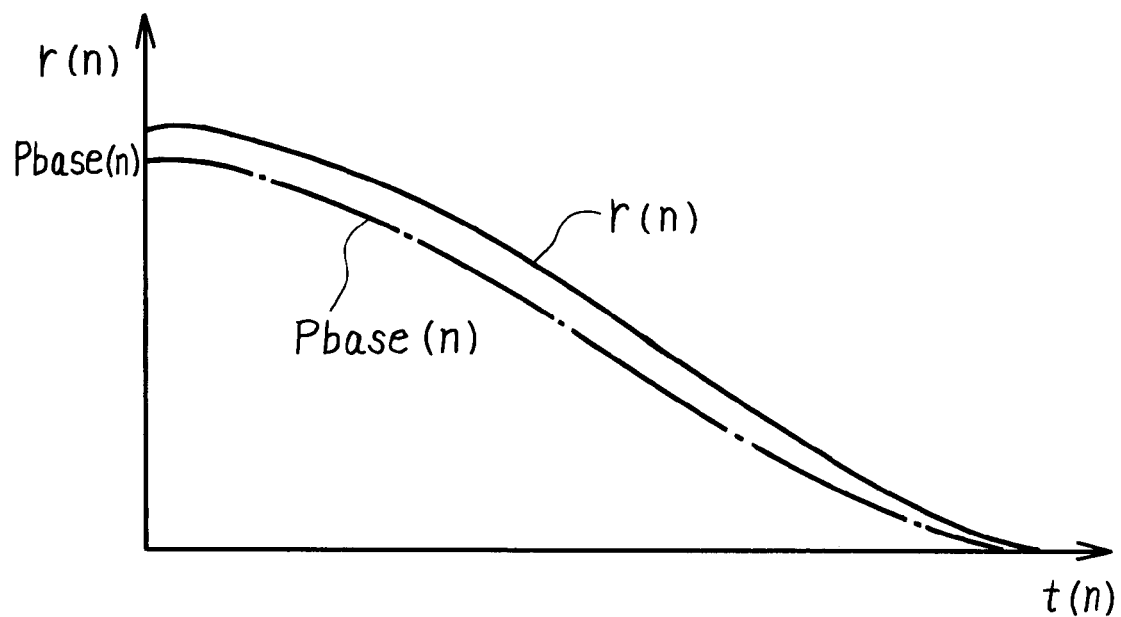
FIG. 6 is a diagram depicting a target position trajectory and a reference trajectory in FIG. 5.

FIG. 5 is a block diagram depicting the first embodiment of the position control system of the present invention, and FIG. 6 is a diagram depicting the operation thereof.

FIG. 5 shows the two degree of freedom position control system using a current observer executed by an MCU 14 in FIG. 1. As FIG. 5 shows, a target position (target cylinder) Tp is provided, and seek control starts. A seek distance calculation block 20 calculates the difference between the target position Tp and the current position, to acquire a seek distance Lseek.

A target trajectory generation block 22 generates a target position trajectory r(n) according to the seek distance Lseek. As FIG. 6 shows, the target trajectory r(n) is a trajectory of a target position of each sample according to the seek distance Lseek.

A base trajectory creation block 24 creates a reference position trajectory Pbase(n) which changes following up the target position trajectory r(n). For example, as FIG. 6 shows, a trajectory having a value smaller than the target position trajectory r(n) by a predetermined value is created as the reference position trajectory Pbase(n). For certain, a trajectory having a value greater than the target position trajectory r(n) by a predetermined value may be created as the reference position trajectory Pbase(n).

Figure 7:
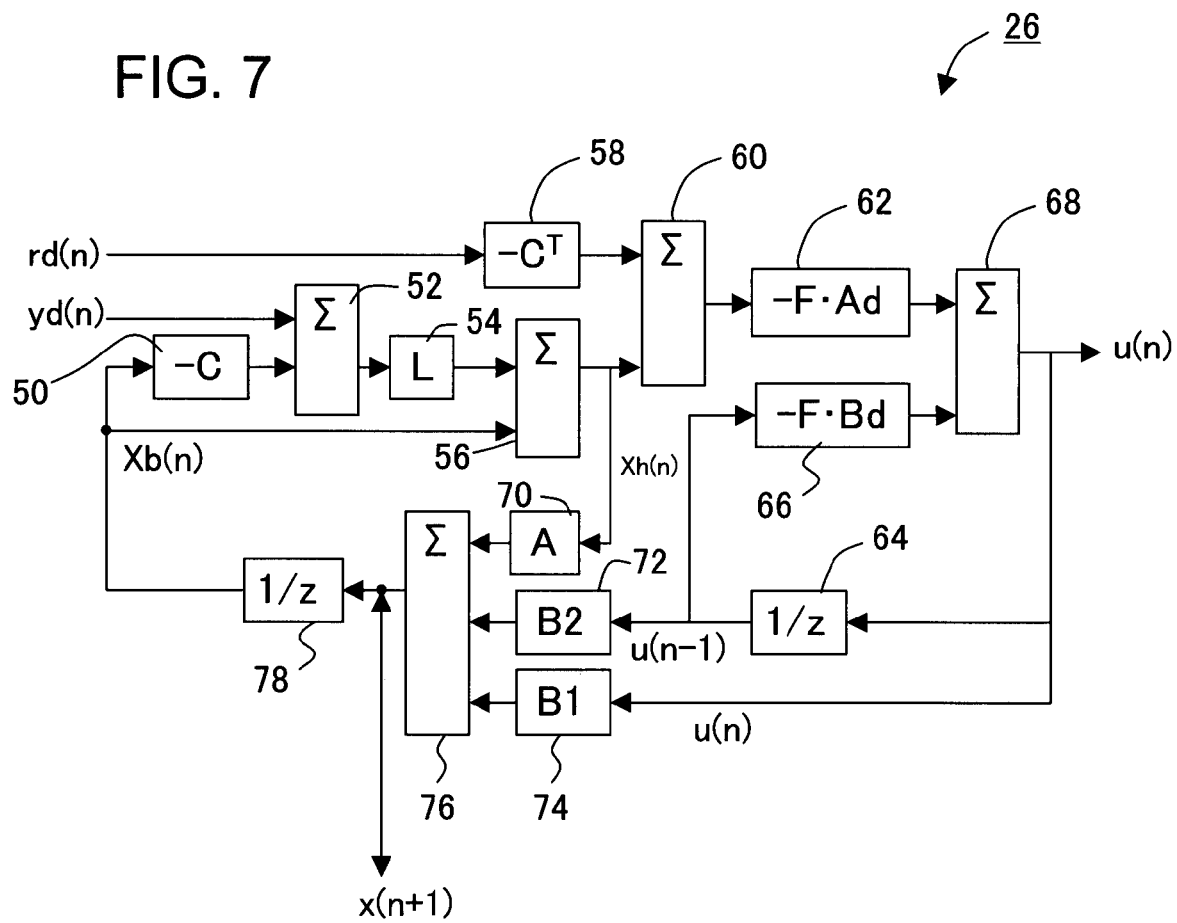
FIG. 7 is a block diagram depicting a current observer of the two degree of freedom control in FIG. 5.

The two degree of freedom controller 26 is comprised of a current observer shown in FIG. 7. A first computing unit 32 subtracts the reference position trajectory Pbase(n) from the target position trajectory r(n) to determine a target position trajectory rd(n) to the controller 26.

A position error computing unit 30 subtracts the target position Tp from an observation position y(n) of a plant 28 (1, 3) to compute a position error y(n). A second computing unit 34 subtracts the reference position trajectory Pbase(n) from the position error y(n) to determine a position error Yd(n) to the controller 26.

A delay block 36 delays the reference position trajectory Pbase(n) of the current sample by one sample. A third computing unit 38 adds a value resulting when the reference position trajectory Pbase(n) of the current sample is subtracted from the reference position trajectory Pbase(n−1) of the previous sample to an estimated position x(n+1) of the controller 26, so as to correct the estimated position x(n+1) of the next sample of the controller 26.

In other words, the inputs r(n) and y(n) of the controller 26 are relative values rd(n) and yd(n) of which reference is the reference position Pbase(n) respectively at each sample time. And the estimated position x(n+1) of the next sample is corrected by the amount of change of the reference position since the reference is the reference position. In other words, for each sample, the estimated position x(n+1) is corrected by a value resulting when the reference position trajectory Pbase (n) is subtracted from the reference position trajectory Pbase (n−1) of the previous sample. This reference position changes according to the change of the target position trajectory r(n).

In this way, relative values are used for inputs to the controller 26, and the controller 26 does not have to handle an absolute value, so it is sufficient that the state variable of the observer constituting the controller 26 holds a relative distance from the reference position. Therefore the range where the value changes is smaller compared with the case of holding an absolute distance. As a consequence, even if a fixed point method is used, the decimal point can be set at the position of plus one bit or plus 2 bits, and calculation accuracy can be improved.

For example, there is a method in which a decimal point position is changed according to the position error. When this method is applied, in the acceleration period where position error is large, the decimal point position is set at plus 1 bit or plus 2 bits (Q2-format), then output current can be computed at 16 times of precision compared with the conventional Q-2-format for the acceleration period in FIG. 4. Therefore the control current in the acceleration period becomes smooth, and the generation of resonance and noise can be prevented.

In a constant velocity period and deceleration period in which the position error becomes small, the decimal point position is set to plus 7 bits or plus 8 bits (Q8-format), then in the constant velocity and deceleration period in FIG. 4, output current can be computed at 16 times of precision compared with the prior art. Therefore in the constant velocity period and deceleration period, the generation of residual vibration can be prevented, and seek time can be decreased.

Also in the case when the configuration in FIG. 5 is constructed by one 16-bit processor, the accuracy of the input of the controller 26 can be improved if computation other than the controller 26 is performed at double precision. In this case, computation of the current observer of the controller 26, which handles the matrix, has a large computation load, but computation other than controller 26 has a small computation load since the matrix is not handled. Therefore even if computation other than the controller 26 is computed at double precision, the influence of an output delay is small.

In the case when only the controller 26 is constructed by a dedicated processor, output delay can be prevented by another processor (e.g. a processor of MCU 14 or HDC 11 in FIG. 1) performing computation other than the controller at double precision.

Two Degree of Freedom Control Current Observer

Now the current observer constituting the controller 26 will be described. The actuator of the magnetic disk device is a rotation type. However this can be converted into and expressed as a state equation of a linear actuator shown in Expression (1). Here 'x' is a position (m), 'v' is a velocity (m/s), 'u' is a current (Ampere), Bl is a force constant (N/m), 'm' is an equivalent mass (kg), 'u' is an output, and 's' is a Laplace operator.

$$s\begin{pmatrix} x \\ v \end{pmatrix} = \begin{pmatrix} 0 & 1 \\ 0 & 0 \end{pmatrix}\begin{pmatrix} x \\ v \end{pmatrix} + \frac{Bl}{m}\begin{pmatrix} 0 \\ 1 \end{pmatrix}u \qquad (1)$$

When the sampling cycle is T(s), the maximum value of the current is Imax (Ampere), and the track width is Lp (m/track), and the unit of position is converted into tracks, the unit of velocity into track/sample, and the unit of current into Imax="1", and Expression (1) is expressed as a digital state equation, then the following Expression (2) is acquired.

$$\begin{pmatrix} x(n+1) \\ v(n+1) \end{pmatrix} = \begin{pmatrix} 1 & 1 \\ 0 & 1 \end{pmatrix}\begin{pmatrix} x(n) \\ v(n) \end{pmatrix} + \frac{Bl}{m}\frac{I_{MAX}}{Lp}T^2\begin{pmatrix} 1/2 \\ 1 \end{pmatrix}u(n) \qquad (2)$$

Now in order to estimate a steady state bias, the following Expression (3), where the steady state bias is constant, is assumed. Here 's' is a Laplace operator.

$$sb=0 \qquad (3)$$

This is converted into a digital space, and the following Expression (4) is acquired.

$$b(n+1)=b(n) \qquad (4)$$

As a disturbance model, the characteristics of the quadratic expression of the following Expression (5) are set.

$$\frac{1}{s^2 + 2\varsigma\omega s + \omega^2} \qquad (5)$$

The analog state equation of the disturbance model of Expression (5) is expressed as the following Expression (6).

$$s\begin{pmatrix} d1 \\ d2 \end{pmatrix} = \begin{pmatrix} 0 & -\omega \\ \omega & -2\varsigma\omega \end{pmatrix}\begin{pmatrix} d1 \\ d2 \end{pmatrix} \qquad (6)$$

This Expression (6) is converted into a digital space, and the following Expression (7) is acquired.

$$\begin{pmatrix} d1(n+1) \\ d2(n+1) \end{pmatrix} = \begin{pmatrix} Ad11 & Ad12 \\ Ad21 & Ad22 \end{pmatrix} \begin{pmatrix} d1(n) \\ d2(n) \end{pmatrix} \quad (7)$$

If Expression (2), Expression (4) and Expression (7) are integrated into an extended model, the following Expression (8) is acquired. Here the steady state bias in Expression (4) and the disturbance expressed as a quadratic expression in Expression (7) are included.

$$\begin{pmatrix} x(n+1) \\ v(n+1) \\ b(n+1) \\ d11(n+1) \\ d12(n+1) \\ d21(n+1) \\ d22(n+1) \end{pmatrix} = \begin{pmatrix} 1 & 1 & 1/2 & 1/2 & 0 & 1/2 & 0 \\ 0 & 1 & 1 & 1 & 0 & 1 & 0 \\ 0 & 0 & 1 & 0 & 0 & 0 & 0 \\ 0 & 0 & 0 & a11 & a12 & 0 & 0 \\ 0 & 0 & 0 & a21 & a22 & 0 & 0 \\ 0 & 0 & 0 & 0 & 0 & b11 & b12 \\ 0 & 0 & 0 & 0 & 0 & b21 & b22 \end{pmatrix} \begin{pmatrix} x(n) \\ v(n) \\ b(n) \\ d11(n) \\ d12(n) \\ d21(n) \\ d22(n) \end{pmatrix} + \frac{Bl}{m}\frac{I_{MAX}}{Lp}T^2 \begin{pmatrix} 1/2 \\ 1 \\ 0 \\ 0 \\ 0 \\ 0 \\ 0 \end{pmatrix} u(n) \quad (8)$$

$$y(n) = \begin{pmatrix} 1 & 0 & 0 & 0 & 0 & 0 & 0 \end{pmatrix} \begin{pmatrix} x(n) \\ v(n) \\ b(n) \\ d11(n) \\ d12(n) \\ d21(n) \\ d22(n) \end{pmatrix}$$

The extended model, including the model of the actuator in Expression (8) and one or a plurality of disturbance models, is simplified and expressed as the following Expression (9).

$$X(n+1)=A \cdot X(n)+B \cdot u(n)$$

$$y(n)=C \cdot X(n) \quad (9)$$

Expression (9) is Expression (8) in which the matrices are simplified by expressing them as X(n+1), X(n), A, B and C. According to Expression (9), the predicted observer is expressed as Expression (10).

$$X(n+1)=A \cdot X(n)+B \cdot u(n)+L \cdot (y(n)-C \cdot X(n))$$

$$u(n)=-F \cdot X(n) \quad (10)$$

This expression is the expression of the analog control observer directly converted into a digital expression. L is a state estimation gain, which consists of four state estimation gains, that is, position, velocity, bias and disturbance (five state estimation gains in the case of Expression (8) since there are two disturbances). F is a feedback gain, and consists of five feedback gains.

In this expression, the observation position y(n) is not reflected to the current output u(n) of the current sample. In other words, the response delays one sample, since this is an estimated observer format. To compensate for the one sample of delay, the current observer is normally used. The current observer is expressed by Expression (11). Here y(n) is an observation position in the current sample.

$$Xh(n)=Xb(n)+L(y(n)-C \cdot Xb(n))$$

$$u(n)=-F \cdot Xh(n)$$

$$Xb(n+1)=A \cdot Xh(n)+B \cdot u(n) \quad (11)$$

In this way, a current observer for performing one computation and changing the drive current once in a sample is constructed.

Figure 8:
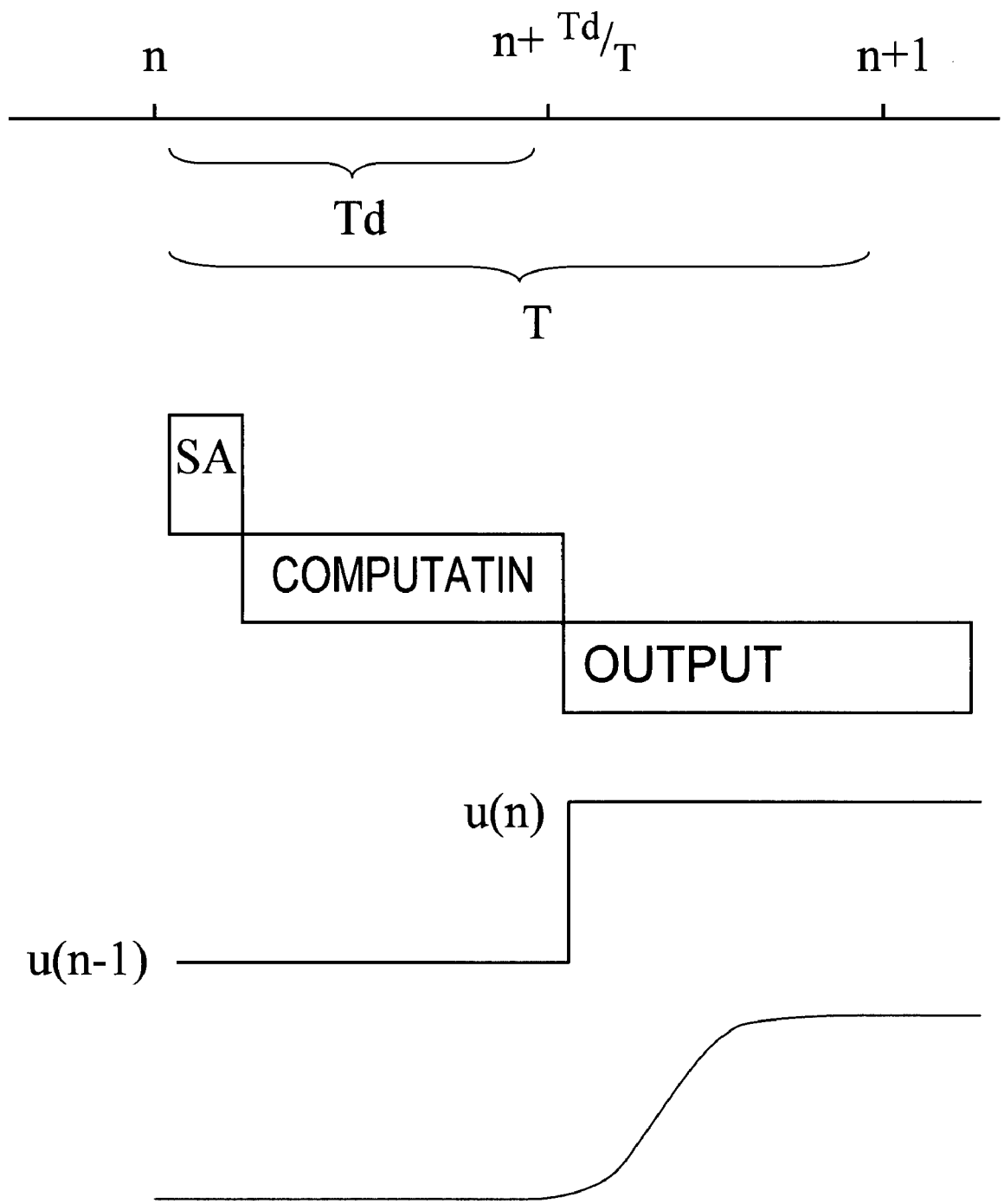
FIG. 8 is a diagram depicting an operation sequence of the current observer in FIG. 7.

Then from this current observer, the configuration of the current observer, considering the output delay, is determined. As FIG. 8 shows, the state variable X at a time delayed (advanced) by time Td from the sample time n is determined in the same way as Expression (10), then this is expressed as the following Expression (12).

$$X(n+Td/T)=Ad \cdot X(n)+Bd \cdot u(n-1) \quad (12)$$

If Expression (12) is expressed as the model of the actuator, just like Expression (2), then this is expressed as Expression (13). In Expression (13), Td, which is a time unit, is converted into sample count n, by dividing Td by the sampling cycle T.

$$\begin{pmatrix} x(n+Td/T) \\ v(n+Td/T) \end{pmatrix} = \begin{pmatrix} 1 & Td/T \\ 0 & 1 \end{pmatrix} \begin{pmatrix} x(n) \\ v(n) \end{pmatrix} + \quad (13)$$

$$\frac{Bl}{m}\frac{I_{MAX}}{Lp}T^2 \begin{pmatrix} Td^2/T^2/2 \\ Td/T \end{pmatrix} u(n-1)$$

The steady state bias 'b', which is always constant, is given by the following Expression (14).

$$b(n+Td/T)=b(n) \quad (14)$$

The other disturbance models can be transformed in the same way as Expression (12) and Expression (13) according to Expression (7). For this transformation, z-transformation is used. If the above mentioned Expression (11) of the current observer and the above expression are combined, the following Expression (15) can be constructed.

$$Xh(n)=Xb(n)+L(y(n)-C \cdot Xb(n))$$

$$Xh(n+Td/T)=Ad \cdot Xh(n)+Bd \cdot u(n-1)$$

$$u(n)=-F \cdot Xh(n+Td/T)$$

$$Xb(n+1)=A \cdot Xh(n)+B1 \cdot u(n)+B2 \cdot u(n-1) \quad (15)$$

In Expression (15), Xh(n) is an estimated state in the current sample n, and Xh(n+Td/T) is an estimated state advanced by Td from the current sample n.

In Expression (15), the estimated state Xh(n) in the current sample n is determined, then the state Xh(n+Td/T) advanced by time Td, considering delay, is calculated based on the estimated state Xh(n) in the current sample n and the output value u(n−1) in the previous sample.

Here in order to estimate the state in the next sample, the output u(n) in the current sample is normally used as shown in Expression (11), but in this sample, which is single rate control where output occurs once in one sample, u(n) is not calculated at a sample point of time. Therefore the already calculated output u(n−1) in the previous sample is used, and the state Xh(n+Td/T) advanced by time Td is calculated. And based on the calculated state Xh(n+Td/T) advanced by time Td, the output u(n) in the current sample n is calculated.

For the estimated state Xb(n+1) of the next sample, u(n) and u(n−1) are used for Expression (15), unlike Expression (11). Here the position x(n+1) and velocity v(n+1) of the estimated state Xb(n+1) of Expression (15) are given by the following Expression (16).

$$\begin{pmatrix} x(n+1) \\ v(n+1) \end{pmatrix} = \begin{pmatrix} 1 & 1 \\ 0 & 1 \end{pmatrix} \begin{pmatrix} x(n) \\ v(n) \end{pmatrix} + \frac{Bl}{m} \frac{I_{MAX}}{Lp} \left\{ \begin{pmatrix} (T-Td)^2/2 \\ T(T-Td) \end{pmatrix} u(n) + \begin{pmatrix} (2T-Td)Td/2 \\ T \cdot Td \end{pmatrix} u(n-1) \right\} \quad (16)$$

The coefficient u(n) of Expression (16) is B1 of Expression (15), and the coefficient of u(n−1) thereof is B2 of Expression (15).

When feed forward of two degree of freedom control is added to Expression (16), Expression (17) is acquired.

$$\left. \begin{array}{l} Xh(n) = Xb(n) + L(y(n) - C \cdot Xb(n)) \\ Xh(n+Td/T) = Ad \cdot (Xh(n) - C^T \cdot r(n)) + Bd \cdot u(n-1) \\ u(n) = -F \cdot Xh(n+Td/T) \\ Xb(n+1) = A \cdot Xh(n) + B1 \cdot u(n) + B2 \cdot u(n-1) \end{array} \right\} \quad (17)$$

In other words, compared with Expression (15), $(C^T \cdot r(n))$, which is a feed forward term, is added to the calculation of Xh(n+Td/T). The matrix C and $C^T$ (transposition of C) in Expression (17) are given by the following Expressions (18) and (19).

$$C = (1 \ 0 \ 0 \ 0 \ 0) \quad (18)$$

$$C^T = \begin{pmatrix} 1 \\ 0 \\ 0 \\ 0 \\ 0 \end{pmatrix} \quad (19)$$

In this case, according to the expression of conventional two degree of freedom control, the feed forward term is directly added to the calculation expression of the output u(n). However if this is used, $(C^T \cdot r(n))$ is subtracted from Xh(n+Td/T) at a different sample point of time, which makes the calculation sequence complicated and high-speed computation difficult. Also the state estimation sequence changes, and maintaining the stability of the entire system may become difficult.

Therefore the feed forward term $(C^T \cdot r(n))$ is added to Xh(n) at a same sample point of time, and Xh(n+Td/T) in an advanced state is calculated.

Expression (17) is simplified by substituting the second expression of Expression (17) for the third expression, then the following Expression (20) is acquired.

$$\left. \begin{array}{l} Xh(n) = Xb(n) + L(y(n) - C \cdot Xb(n)) \\ u(n) = -F \cdot Ad \cdot (Xh(n) - C^T \cdot r(n)) - F \cdot Bd \cdot u(n-1) \\ Xb(n+1) = A \cdot Xh(n) + B1 \cdot u(n) + B2 \cdot u(n-1) \end{array} \right\} \quad (20)$$

FIG. 7 is a block diagram when Expression (20) is blocked. As FIG. 7 shows, the observation position (position error of which reference is the reference position trajectory from the computing unit 34 in FIG. 5) yd(n) in the current sample n is acquired, and the difference between the predicted position C·Xb(n) in the current sample estimated in the previous sample and the observation position yr(n) is computed in the computation block 52, and the estimated position error er[n] is generated. This estimated position error er[n] is multiplied by the estimated gain L in the multiplication block 54, so as to generate a correction value.

In the addition block 56, this correction value and estimated state Xb[n], such as a predicted position and predicted velocity, in the current sample, are added. By this, the estimated state Xh(n), such as the estimated position and estimated velocity, in the current sample of Expression (20), is generated.

And in the two degree of freedom control, the difference value between the estimated state (position) Xh(n) and the target position trajectory (target position trajectory of which reference is the reference position trajectory from the computing unit 32 in FIG. 5) rd(n) is computed in the addition block 60, and the result is multiplied by a coefficient matrix −F·Ad in the multiplication block 62. On the other hand, the output u(n−1) is multiplied by a coefficient matrix −F·Bd in the multiplication block 66, and this result and the result of the multiplication block 62 are added in the addition block 68, so as to acquire the output value u(n) of the second expression of Expression (20) based on the state Xh(n+Td/T) advanced by time Td.

On the other hand, the estimated state Xb(n+1) in the next sample (n+1) is calculated as shown in the third expression of Expression (20) in the multiplication blocks 70, 72 and 74 and the addition block 76 based on the estimated state Xh(n) in the current sample, output value u(n), and the output value u(n−1) in the previous sample delayed by the delay block 64.

In the delay block 78, the estimated state Xb(n+1) in the next sample (n+1) is delayed, and in the multiplication block 50, the output of the delay block 78 is multiplied by the matrix C in Expression (18), so as to calculate the estimated position x(n) in the current sample.

Also as described in FIG. 5, the estimated position x(n+1) of the estimated state Xb(n+1) in the next sample in the addition block 76 is corrected with a value resulting when the reference position trajectory Pbase(n) in the current sample is subtracted from the reference position trajectory Pbase(n−1) in the previous sample.

In this example, in the two degree of freedom control system for preventing overrun, the estimated state at time Td advanced by an amount of delay from the sample point of time is computed considering the delay of output of the two degree of freedom control (computing delay and hardware delay of drive amplifier, D/A converter, etc.), and the output is computed based on this estimated state, so even if state changes during calculation from a sample point of time, the influence of an output delay can be prevented, therefore highly accurate position control is possible, and overrun can be prevented.

Also since the two degree of freedom control terms are calculated at a same sample time, the calculation sequence becoming complicated can be prevented, and calculation can be performed at high-speed. Also the state estimation sequence can be adhered to, so stability of the entire system can be maintained.

Second Embodiment of Two Degree of Freedom Position Control System

Figure 9:
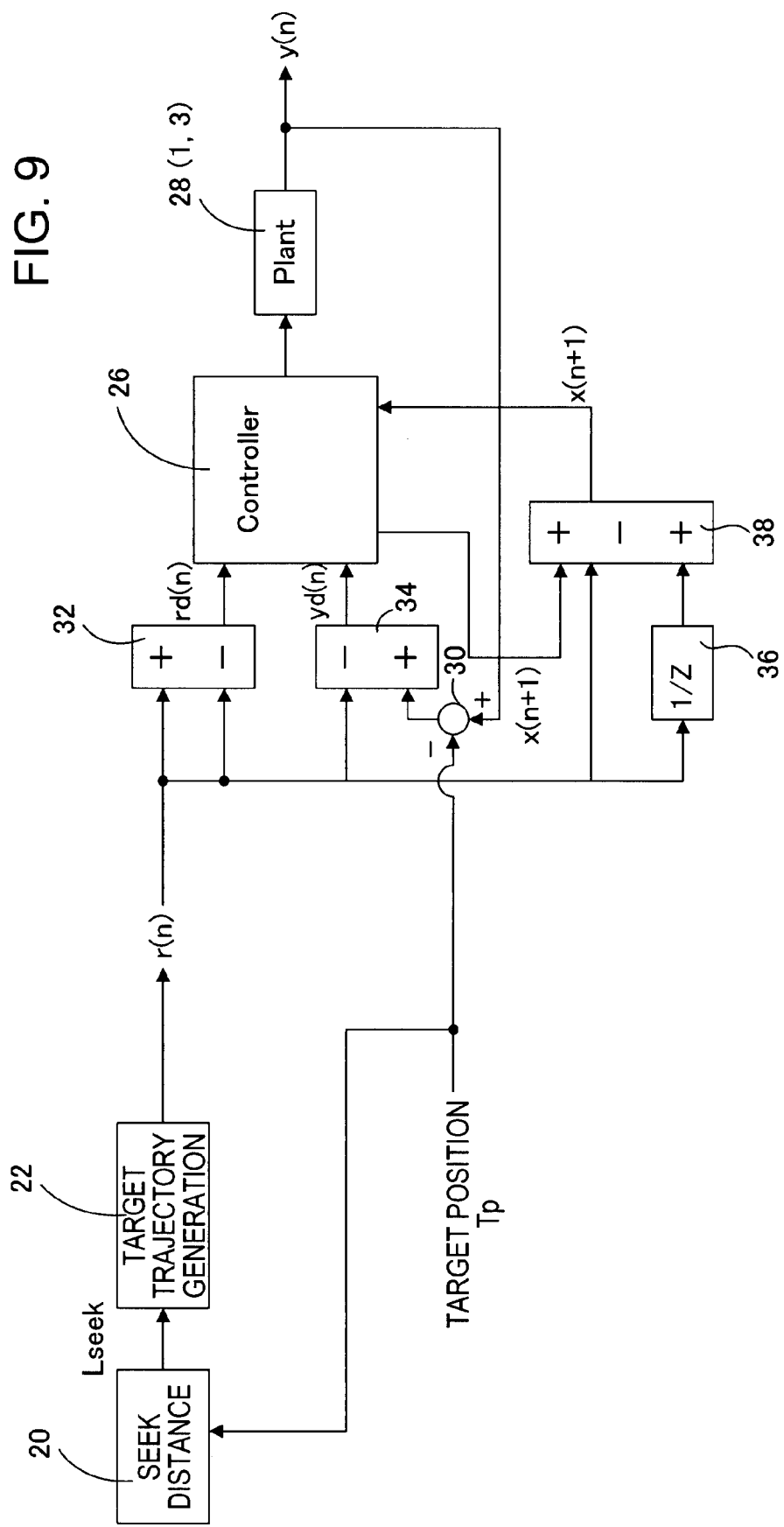
FIG. 9 is a block diagram depicting a two degree of freedom control system according to the second embodiment of the present invention.

FIG. 9 is a block diagram depicting the second embodiment of the position control system of the present invention, and shows the two degree of freedom control system using the current observer executed by the MCU 14 in FIG. 1. In FIG. 9, composing elements the same as those in FIG. 5 are denoted with the same reference symbols.

As FIG. 9 shows, a target position (target cylinder) Tp is provided, and seek control starts. A seek distance calculation block 20 calculates the difference between the target position Tp and the current position, to acquire a seek distance Lseek.

A target trajectory generation block 22 generates a target position trajectory r(n) according to the seek distance Lseek. As FIG. 6 shows, the target trajectory r(n) is a trajectory of a target position of each sample according to the seek distance Lseek.

A two degree of freedom controller 26 is comprised of a current observer shown in FIG. 7. A first computing unit 32 subtracts the target position trajectory r(n) from the target position trajectory r(n) to determine a target position trajectory rd(n) to the controller 26. In other words, the target position trajectory rd(n) to the controller 26 is "0".

A position error computing unit 30 subtracts the target position Tp from an observation position y(n) of a plant 28 (1, 3) to compute a position error y(n). A second computing unit 34 subtracts the target position trajectory r(n) from the position error y(n) to determine a position error yd(n) to the controller 26.

A delay block 36 delays the target position trajectory r(n) of the current sample by one sample. A third computing unit 38 adds a value resulting when the target position trajectory r(n) of the current sample is subtracted from the target position trajectory r(n−1) of the previous sample, to an estimated position x(n+1) of the controller 26, so as to correct the estimated position x(n+1) of the next sample of the controller 26.

In other words, the inputs r(n) and y(n) of the controller 26 are relative values rd(n) and yd(n) of which reference is the target position trajectory respectively at each sample time. And the estimated position x(n+1) of the next sample is corrected by the amount of change of the target position trajectory since the reference is the target position trajectory. In other words, for each sample, the estimated position x(n+1) is corrected by a value resulting when the target position trajectory r(n) of the current sample is subtracted from the target position trajectory r(n−1) of the previous sample.

This reference position is the target position trajectory, and changes according to the change of the target position trajectory r(n), just like FIG. 5.

In this way, even if the reference position is the target position trajectory, relative values can be used for inputs to the controller 26, and the controller 26 does not have to handle an absolute value, so it is sufficient that the state variable of the observer constituting the controller 26 holds a relative distance from the reference position. Therefore the range where the value changes is smaller compared with the case of holding an absolute distance. As a consequence, even if a fixed point method is used, the decimal point can be set at the position of plus one bit or plus two bits, and calculation accuracy can be improved.

Also it is unnecessary to generate the reference position trajectory in FIG. 5, so this embodiment can be implemented more easily with less computing load.

Third Embodiment of the Position Control System

Figure 10:
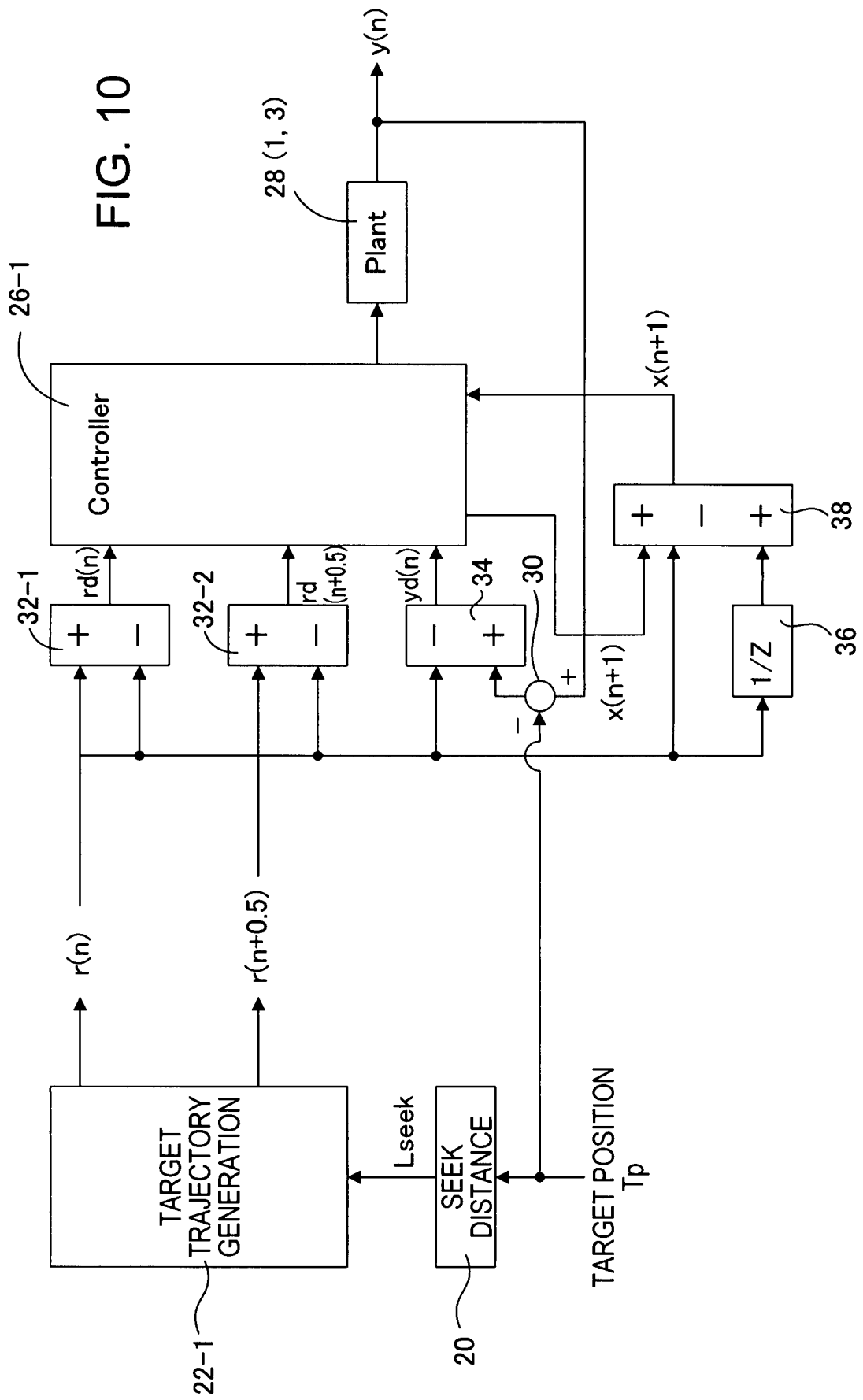
FIG. 10 is a block diagram depicting a two degree of freedom control system according to the third embodiment of the present invention.
Figure 11:
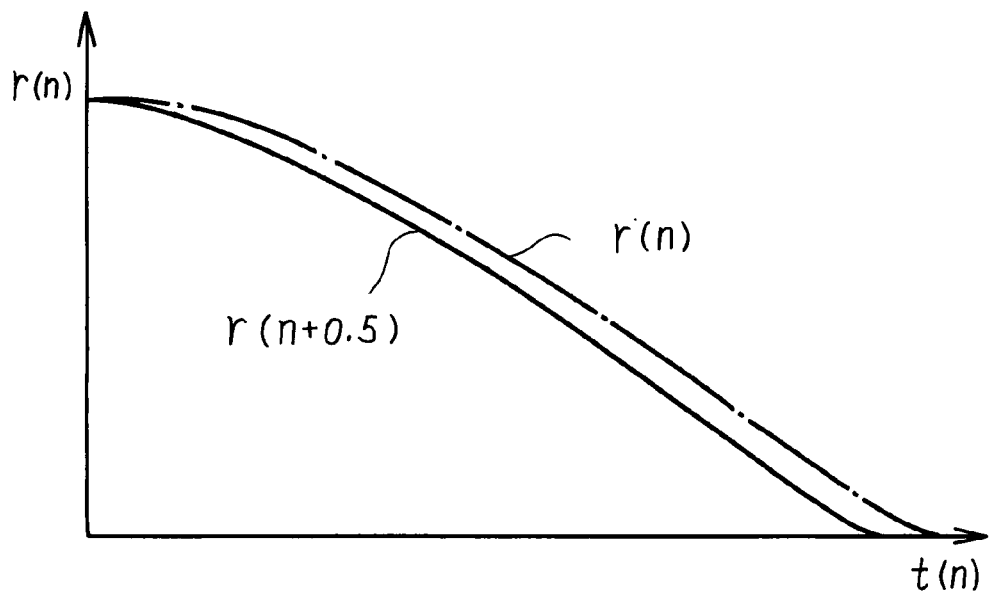
FIG. 11 is a diagram depicting a target position trajectory in FIG. 10.
Figure 12:
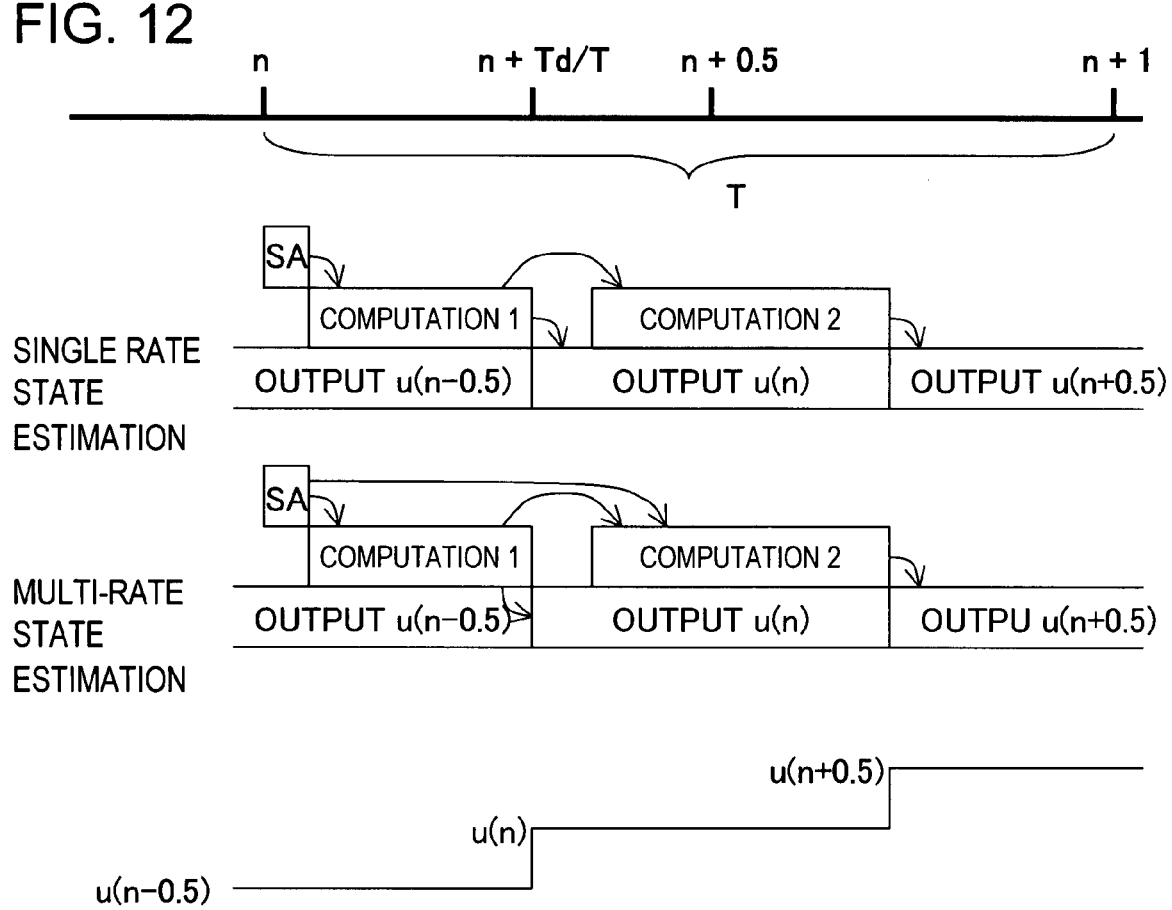
FIG. 12 is a diagram depicting a multi-rate control in FIG. 10.

FIG. 10 is a block diagram depicting the third embodiment of the two degree of freedom position control system of the present invention, FIG. 11 is a diagram depicting the target position trajectory thereof, and FIG. 12 is an operation sequence diagram of multi-rate control. FIG. 10 to FIG. 12 show the configuration of a two degree of freedom control system using double multi-rate control. In FIG. 10, composing elements the same as those in FIG. 5 and FIG. 9 are denoted with the same reference symbols.

Multi-rate control changes the current twice or three times in one sample, as shown in FIG. 12. Changing twice is called a "double multi-rate configuration", and changing three times is called a "triple multi-rate configuration".

As the double multi-rate configuration in FIG. 10 shows, a target position (target cylinder) Tp is provide and seek control starts. A seek distance calculation block 20 calculates the difference between the target position Tp and a current position, so as to acquire the seek distance Lseek.

A target trajectory generation block 22-1 generates a target trajectory r(n) in a sample n and a target trajectory r(n+0.5) in a sample (n+0.5) for each sample according to the seek distance Lseek. For example, as FIG. 11 shows, the target trajectory r(n) is a trajectory of a target position of each sample according to the seek distance Lseek, and r(n+0.5) is a target position trajectory at time advanced by a 0.5 sample from r(n).

Figure 13:
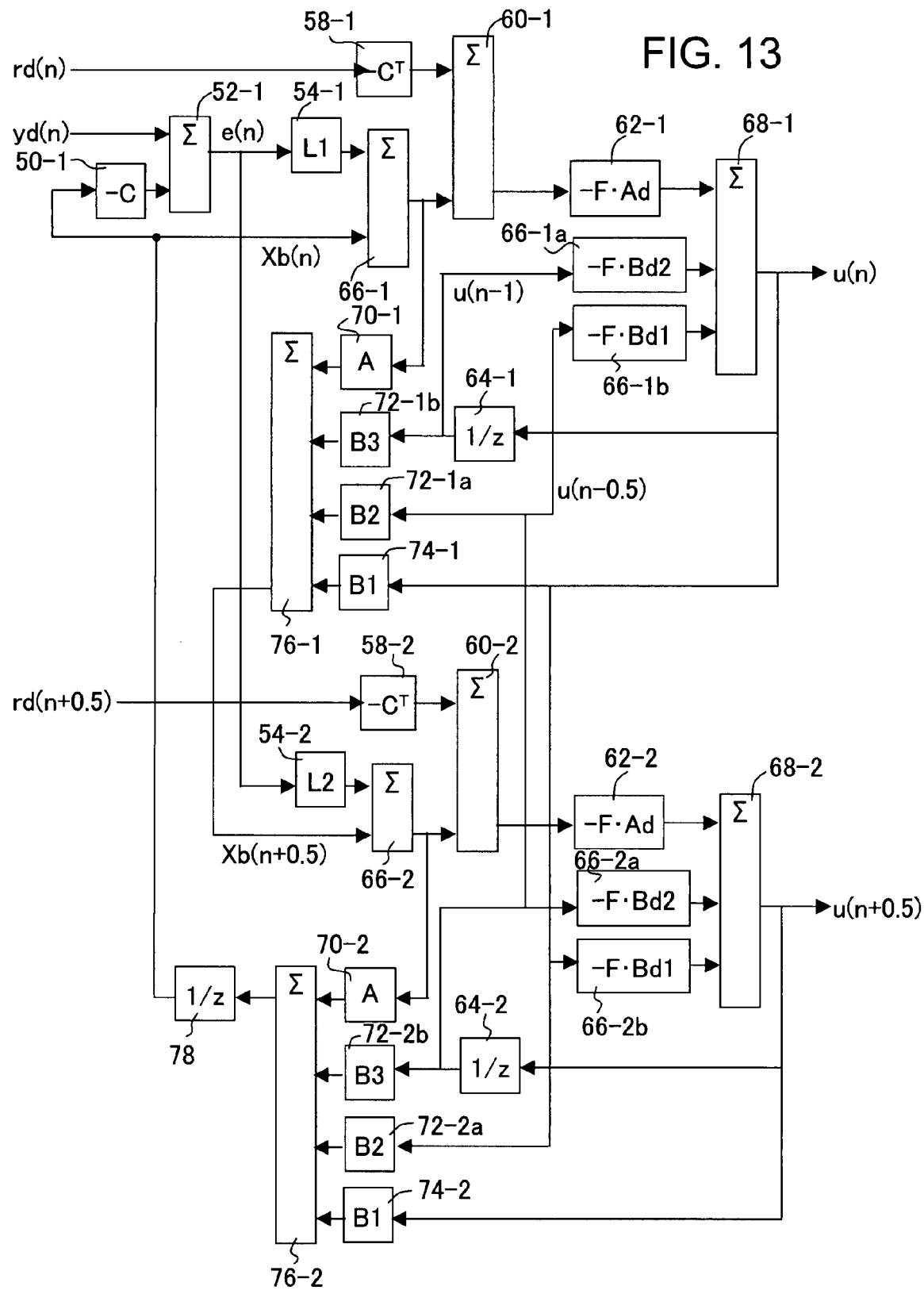
FIG. 13 is a block diagram depicting a current observer of the multi-rate control in FIG. 10.

A two degree of freedom controller 26-1 is comprised of a multi-rate control current observer shown in FIG. 13. A first computing unit 32-1 subtracts the target position trajectory r(n) from the target position trajectory r(n) to determine a target position trajectory rd(n) to the controller 26-1. In other words, the target position trajectory rd(n) to the controller 26-1 is "0".

A fourth computing unit 32-2 subtracts the target position trajectory r(n) from the target position trajectory r(n+0.5) to determine the target position trajectory rd (n+0.5) to the controller 26-1. In other words, the target position trajectory rd (n+0.5) to the controller 26-1 is a position trajectory of which reference is the target position trajectory r(n).

A position error computing unit 30 subtracts the target position Tp from an observation position y(n) of a plant 28 (1, 3) to compute a position error y(n). A second computing unit 34 subtracts the target position trajectory r(n) from the position error y(n) to determine a position error yd(n) to the controller 26-1.

A delay block 36 delays the target position trajectory r(n) of the current sample by one sample. A third computing unit 38 adds a value resulting when the target position trajectory r(n) of the current sample is subtracted from the target position trajectory r(n−1) of the previous sample, to the estimated position x(n+1) of the controller 26-1, so as to correct the estimated position x(n+1) of the next sample of the controller 26-1.

In other words, inputs r(n), r(n+0.5) and y(n) of the multi-rate controller 26-1 are relative values rd(n), rd(n+0.5) and yd(n) of which reference is the target position trajectory at each sample time. And the estimated position x(n+1) of the next sample is corrected by the amount of change of the target position trajectory since the reference is the target position trajectory. In other words, for each sample, the estimated position x(n+1) is corrected by a value resulting when the target position trajectory r(n) of the current sample is subtracted from the target position trajectory r(n−1) of the previous sample.

This reference position is the target position trajectory r(n) itself, and changes according to the change of the target position trajectory r(n), just like the case in FIG. 5.

In this way, even if the reference position is the target position trajectory, relative values can be used for inputs to the controller 26, and the controller 26-1 does not have to handle an absolute value, so it is sufficient that the state variable of the observer constituting the controller 26-1 holds a relative distance from the reference position. Therefore the range where the value changes is smaller compared with the case of holding an absolute distance. As a consequence, even if a fixed point method is used, the decimal point can be set at the position of plus one bit or plus two bits, and calculation accuracy can be improved.

Also it is unnecessary to generate the reference position trajectory in FIG. 5, so this embodiment can be implemented more easily with less computing load.

Multi-Rate Control Current Observer

Now the multi-rate control current observer in FIG. 10 will be described. As FIG. 12 shows, the multi-rate control has a single rate state estimation for estimating the state at a single rate, and a multi-rate state estimation for estimating state at a multi-rate. In both cases, current is computed and changed twice as u(n) and u(n+0.5) in one sample.

First the multi-rate control of the single rate state estimation will be described. In multi-rate control, the current output value is output as u(n) and u(n+0.5) in one sample. Therefore basically Expression (17) is computed twice. In other words, the following Expression (21) and Expression (22) are executed.

In other words, first Expression (21) is computed to compute the output u(n) and the next state Xb(n+0.5). Expression (21) is basically the same as Expression (17), but u(n−1) and u(n−0.5) are used for computing Xh(n+Td/T) and Xb(n+0.5) since current changes twice in one sample.

And as Expression (22) shows, the estimated state Xh(n+0.5) in the sample (n+0.5) is assumed as the estimated state Xb(n+0.5) in Expression (21), and the output u(n+0.5) and the next state Xb(n+1) are computed using the target trajectory r(n+0.5), just like the case of Expression (21).

Here the coefficients B1, B2 and B3 in Expression (21) and Expression (22) depend on the comparison of Td to which delay is added and T/2 (=n+0.5), and is determined by the following Expression (23) if Td<T/2.

$$\begin{pmatrix} x(n+0.5) \\ v(n+0.5) \end{pmatrix} = \begin{pmatrix} 1 & 1/2 \\ 0 & 1 \end{pmatrix} \begin{pmatrix} x(n) \\ v(n) \end{pmatrix} + \qquad (23)$$

$$\frac{Bl}{m} \frac{I_{MAX}}{Lp} \left\{ \begin{pmatrix} (T-2Td)^2/8 \\ T(T-2Td)/2 \end{pmatrix} u(n) + \begin{pmatrix} (T-Td)Td/2 \\ T \cdot Td \end{pmatrix} u(n-0.5) \right\}$$

If T/2<Td<T, on the other hand, the coefficients B1, B2 and B3 are determined by the following Expression (24).

$$\begin{pmatrix} x(n+0.5) \\ v(n+0.5) \end{pmatrix} = \begin{pmatrix} 1 & 1/2 \\ 0 & 1 \end{pmatrix} \begin{pmatrix} x(n) \\ v(n) \end{pmatrix} + \qquad (24)$$

$$\frac{Bl}{m} \frac{I_{MAX}}{Lp} \left\{ \begin{pmatrix} (T-2Td)^2/8 \\ T(T-2Td)/2 \end{pmatrix} u(n-0.5) + \begin{pmatrix} (T-Td)Td/2 \\ T \cdot Td \end{pmatrix} u(n-1) \right\}$$

In other words, the coefficient of u(n) of Expressions (23) and (24) is B1 of Expressions (21) and (22), the coefficient of u(n−0.5) is B2, and the coefficient of u(n−1) is B3. Therefore if Td<T/2, then coefficient B3 is "0", and if T/2<Td, B1 is "0".

Now multi-rate control in the multi-rate state estimation will be described. In multi-rate control as well, current output values u(n) and u(n+0.5) are output in one sample. Therefore in multi-rate state estimation as well, Expression (17) is basically computed twice. In other words, the following Expressions (25) and (26) are executed.

$$\left.\begin{aligned}
Xh(n) &= Xb(n) + L(y(n) - C \cdot Xb(n)) \\
Xh(n + Td/T) &= Ad \cdot (Xh(n) - C^T \cdot r(n)) + Bd1 \cdot u(n-0.5) + Bd2 \cdot u(n-1) \\
u(n) &= -F \cdot Xh(n + Td/T) \\
Xb(n+0.5) &= A \cdot Xh(n) + B1 \cdot u(n) + B2 \cdot u(n-0.5) + B3 \cdot u(n-1)
\end{aligned}\right\} \qquad (21)$$

$$\left.\begin{aligned}
Xh(n+0.5) &= Xb(n+0.5) \\
Xh(n+0.5+Td/T) &= Ad \cdot (Xh(n+0.5) - C^T \cdot r(n+0.5)) + Bd1 \cdot u(n) + Bd2 \cdot u(n-0.5) \\
u(n+0.5) &= -F \cdot Xh(n+0.5+Td/T) \\
Xb(n+1) &= A \cdot Xh(n) + B1 \cdot u(n+0.5) + B2 \cdot u(n) + B3 \cdot u(n-0.5)
\end{aligned}\right\} \qquad (22)$$

$$\left.\begin{aligned}&e(n) = y(n) - C \cdot Xb(n)\\&Xh(n) = Xb(n) + L1 \cdot e(n)\\&Xh(n + Td/T) = Ad \cdot (Xh(n) - C^T \cdot r(n)) + Bd1 \cdot u(n - 0.5) + Bd2 \cdot u(n - 1)\\&u(n) = -F \cdot Xh(n + Td/T)\\&Xb(n + 0.5) = A \cdot Xh(n) + B1 \cdot u(n) + B2 \cdot u(n - 0.5) + B3 \cdot u(n - 1)\end{aligned}\right\} \quad (25)$$

$$\left.\begin{aligned}&Xh(n + 0.5) = Xb(n + 0.5) + L2 \cdot e(n)\\&Xh(n + 0.5 + Td/T) = Ad \cdot (Xh(n + 0.5) - C^T \cdot r(n + 0.5)) + Bd1 \cdot u(n) + Bd2 \cdot u(n - 0.5)\\&u(n + 0.5) = -F \cdot Xh(n + 0.5 + Td/T)\\&Xb(n + 1) = A \cdot Xh(n) + B1 \cdot u(n + 0.5) + B2 \cdot u(n) + B3 \cdot u(n - 0.5)\end{aligned}\right\} \quad (26)$$

First, in order to compute the output u(n) and the next state Xb(n+0.5), Expression (25) is computed. This Expression (25) is basically the same as Expression (17), but current changes twice in one sample, so u(n−1) and u(n−0.5) are used for computing Xh(n+Td/T) and Xb(n+0.5). The estimated position error e(n) is separately computed by (y(n)−C·Xb(n)).

And as Expression (26) shows, the estimated state Xh(n+0.5) in the sample (n+0.5) is corrected to the estimated state Xb(n+0.5) in Expression (25) by a value resulting when e(n) in Expression (25) is multiplied by L2. Also using the target trajectory r(n+0.5), the output u(n+0.5) and the next state Xb(n+1) are computed, just like Expression (25).

Here the coefficients B1, B2 and B3 in Expression (25) and Expression (26) depend on the comparison of Td to which delay is added and T/2 (=n+0.5), and is determined by Expression (23) if Td<T/2, and by Expression (24) if 2/T<Td.

The difference from the single rate state estimation in Expression (21) and Expression (22) is that the estimated state Xh(n+0.5) in the sample (n+0.5) is corrected to the estimated state Xb(n+0.5) in Expression (25), using a value resulting when e(n) in Expression (25) is multiplied by L2, as shown in Expression (26). In this way, multi-rate state estimation corrects the second estimated state with the position error observed at sample time, just like the first time.

If Xh(n+Td/T) and Xh(n+0.5+Td/T) in Expression (25) and Expression (26) are substituted for other expressions in Expression (25) and Expression (26), Expression (25) and Expression (26) can be transformed to the following Expression (27).

and Expression (22), and when L2 is not "0", this indicates a multi-rate state estimation expression.

FIG. 13 is a block diagram blocking Expression (27). The configuration in FIG. 13 is basically two configurations in FIG. 7 connected in series. As FIG. 13 shows, the observation position (position error from the error computing unit 34 in FIG. 10) yd(n) in the current sample n is loaded, and the difference between the predicted position C·Xb(n) in the current sample estimated in the previous sample and the observation position yd(n) is computed in the computing block 52-1, so as to generate the estimated position error er[n]. In the multiplication block 54-1, this estimated position error er[n] is multiplied by the estimated gain L1 to generate the correction value.

In the addition block 66-1, this correction value and the estimated state Xb[n], such as a predicted position and predicted velocity, in the current sample, are added. By this, the estimated state Xh(n), such as the estimated position and estimated velocity, in the current sample in Expression (27), is generated.

And in the two degree of freedom control, the difference value between the estimated state (position) Xh(n) and the target position trajectory rd(n) is computed in the addition block 60-1, and the result is multiplied by the coefficient matrix −F·Ad in the multiplication block 62-1. On the other hand, the output u(n−1) is multiplied by the coefficient matrix −F·Bd2 in the multiplication block 66-1a, and the output u(n−0.5) is multiplied by the coefficient matrix −F·Bd1 in the multiplication block 66-1b. The outputs of the three multipli- $$\left.\begin{aligned}&e(n) = y(n) - C \cdot Xb(n)\\&Xh(n) = Xb(n) + L1 \cdot e(n)\\&u(n) = -F \cdot Ad \cdot (Xh(n) - C^T \cdot r(n)) - F \cdot Bd1 \cdot u(n - 0.5) - F \cdot Bd2 \cdot u(n - 1)\\&Xb(n + 0.5) = A \cdot Xh(n) + B1 \cdot u(n) + B2 \cdot u(n - 0.5) + B3 \cdot u(n - 1)\\&Xh(n + 0.5) = Xb(n + 0.5) + L2 \cdot e(n)\\&u(n + 0.5) = -F \cdot Ad \cdot (Xh(n + 0.5) - C^T \cdot r(n + 0.5)) - F \cdot Bd1 \cdot u(n) - F \cdot Bd2 \cdot u(n - 0.5)\\&Xb(n + 1) = A \cdot Xh(n) + B1 \cdot u(n + 0.5) + B2 \cdot u(n) + B3 \cdot u(n - 0.5)\end{aligned}\right\} \quad (27)$$

In Expression (27), Xh(n+Td/T) of Expression (25) is integrated into the calculation of u(n) of Expression (26), and Xh(n+0.5+Td/T) of Expression (26) are integrated into the calculation of u(n+0.5) of Expression (26). As the number of expressions decreases, the calculation time naturally decreases, and response become faster.

When L2 in Expression (27) is "0", this indicates the single rate state estimation expression described in Expression (21)

cation blocks 62-1, 66-1a and 66-1b are added in the addition block 68-1, and the output value u(n) of the third expression in Expression (27) is acquired.

On the other hand, the next estimate state Xb(n+0.5) in (n+0.5) is calculated as the fourth expression of Expression (27) by adding a value resulting when the estimated state Xh(n) in the current sample is multiplied by the coefficient matrix A in the multiplication block 70-1, a value resulting when the output value u(n) is multiplied by the coefficient matrix B1 in the multiplication block 74-1, a value resulting when the output value u(n−0.5) is multiplied by the coefficient matrix B2 in the multiplication block 72-1a, and a value resulting when the output value u(n−1) in the previous sample delayed in the delay block 64-1 is multiplied by the coefficient matrix B3 in the multiplication block 72-1b in the addition block 76-1.

Then the estimated position error er[n] computed in the computating block 52-1 is multiplied by the estimated gain L2 in the multiplication block 54-2, so as to generate a correction value. And in the addition block 66-2, this correction value and the estimated state Xb[n+0.5], such as a predicted position and predicted velocity, in the current sample, are added. By this, the estimated state Xh(n+0.5), such as an estimated position and estimated velocity, in the current sample of Expression (27), are generated.

And in multi-rate control, the difference value between the estimated state (position) Xh(n+0.5) and the target position trajectory rd(n+0.5) is computed in the addition block 60-2, and the result is multiplied by the coefficient matrix −F·Ad in the multiplication block 62-2.

On the other hand, the output u(n−0.5) is multiplied by the coefficient matrix −F·Bd2 in the multiplication block 66-2a, and the output u(n) is multiplied by the coefficient matrix −F·Bd1 in the multiplication block 66-2b. The outputs of the three multiplication blocks 62-2, 66-2a and 66-2b are added in the addition block 68-2, and the output value u(n+0.5) of the sixth expression of Expression (27) is acquired.

On the other hand, the next estimated state Xb(n+1) in (n+1) is calculated as the seventh expression of Expression (27), by adding a value resulting when the estimated state Xh(n+0.5) in the current sample is multiplied by the coefficient matrix A in the multiplication block 70-2, a value resulting when the output value u(n+0.5) is multiplied by the coefficient matrix B1 in the multiplication block 74-2, a value resulting when the output value u(n) is multiplied by the coefficient matrix B2 in the multiplication block 72-2a, and a value resulting when the output value u(n−0.5) in the previous sample delayed in the delay block 64-2 is multiplied by the coefficient matrix B3 in the multiplication block 72-2b, in the addition block 76-2.

In the delay block 78, the estimated state Xb(n+1) in the next sample (n+1) is delayed, and in the multiplication block 50-1, the output of the delay block 78 is multiplied by C so as to calculate the estimated position x(n) in the current sample.

Also as described in FIG. 10, the estimated position x(n+1) of the estimated state Xb(n+1) of the next sample in the addition block 76-2 is corrected with a value resulting when the target position trajectory r(n) in the current sample is subtracted from the target position trajectory r(n−1) in the previous sample.

In this way, in the two degree of freedom control system for preventing overrun, the estimated state at time Td advanced by the amount of delay from the sample point of time is computed considering the delay of output of the two degree of freedom control (computing delay and hardware delay of drive amplifier, D/A converter, etc.), and the output is computed based on this estimated state, so even if state changes during calculation from the sample point of time, the influence of an output delay can be prevented, therefore highly accurate position control is possible, and overrun can be prevented.

Also since the two degree of freedom control terms are calculated at a same sample time, the calculation sequence becoming complicated can be prevented, and calculation can be performed at high-speed. Also the state estimation sequence can be maintained, so stability of the entire system can be maintained. As a result, a multi-rate control observer can be easily constructed.

In the blocks in FIG. 13, if L2 in the multiplication block 54-2 is set to "0", it becomes the configuration of single rate state estimation, so the configuration of FIG. 13 can be used for both single rate and multi-rate state estimation.

Fourth Embodiment of Position Control System

Figure 14:
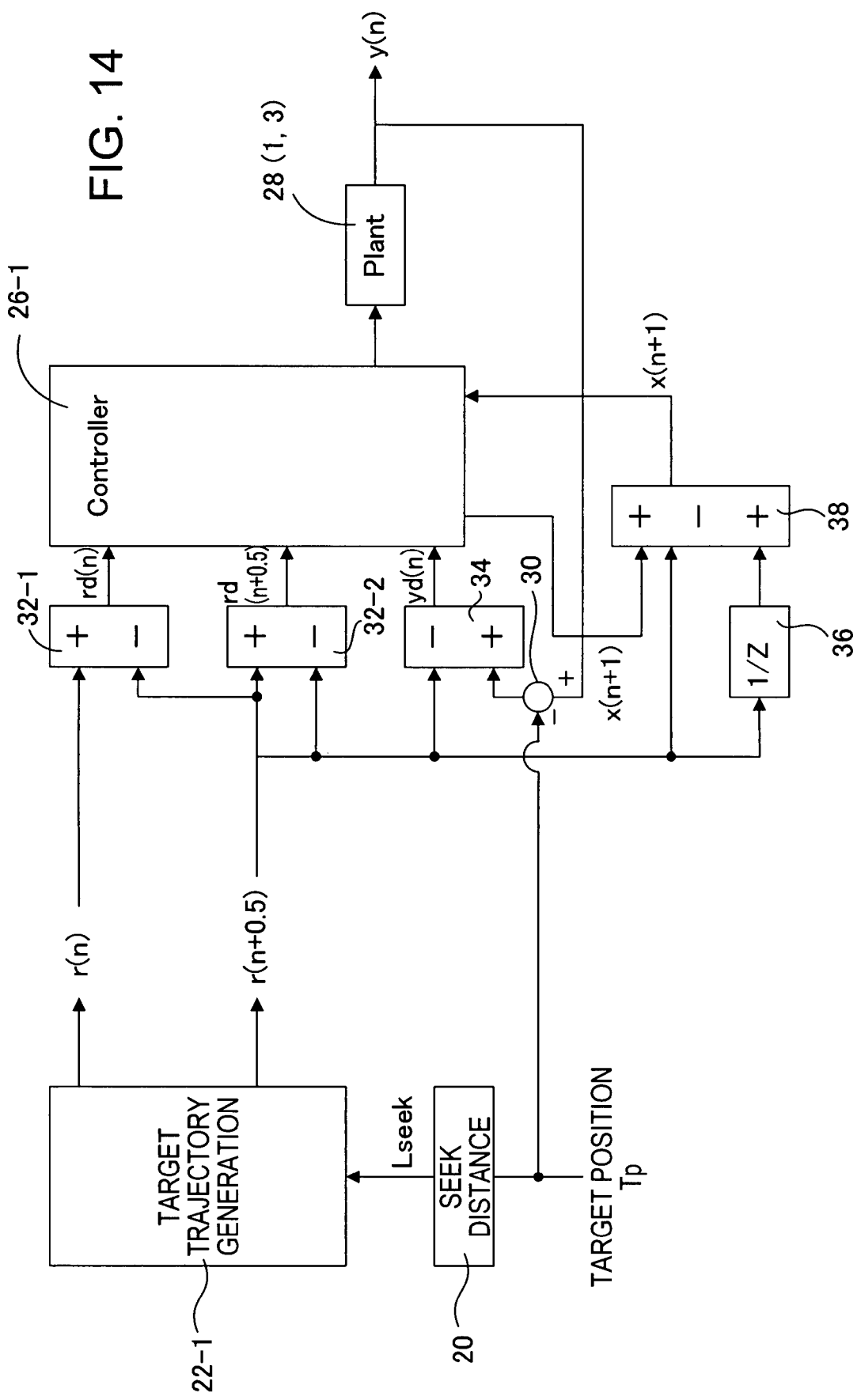
FIG. 14 is a block diagram depicting a two degree of freedom control system according to the fourth embodiment of the present invention.
Figure 15:
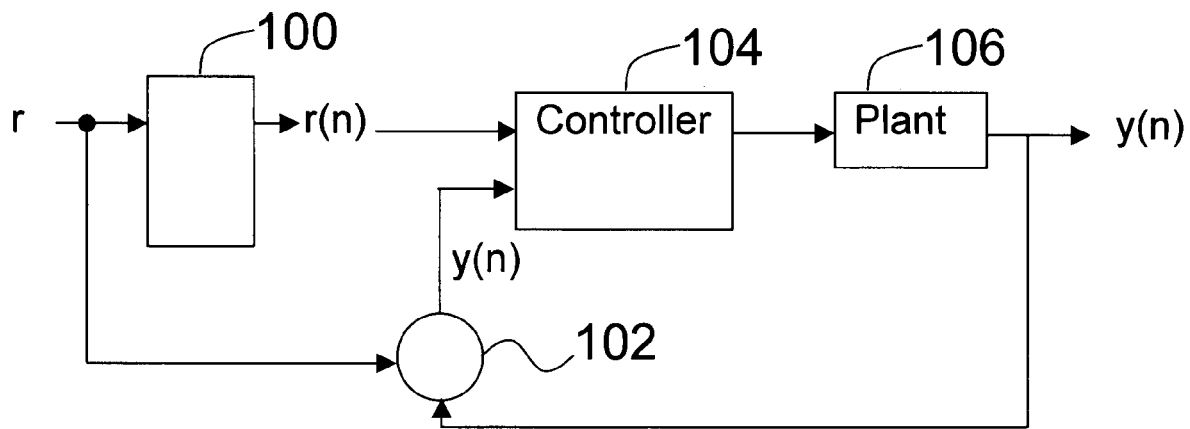
FIG. 15 is a block diagram depicting a two degree of freedom control of a prior art.
Figure 16:
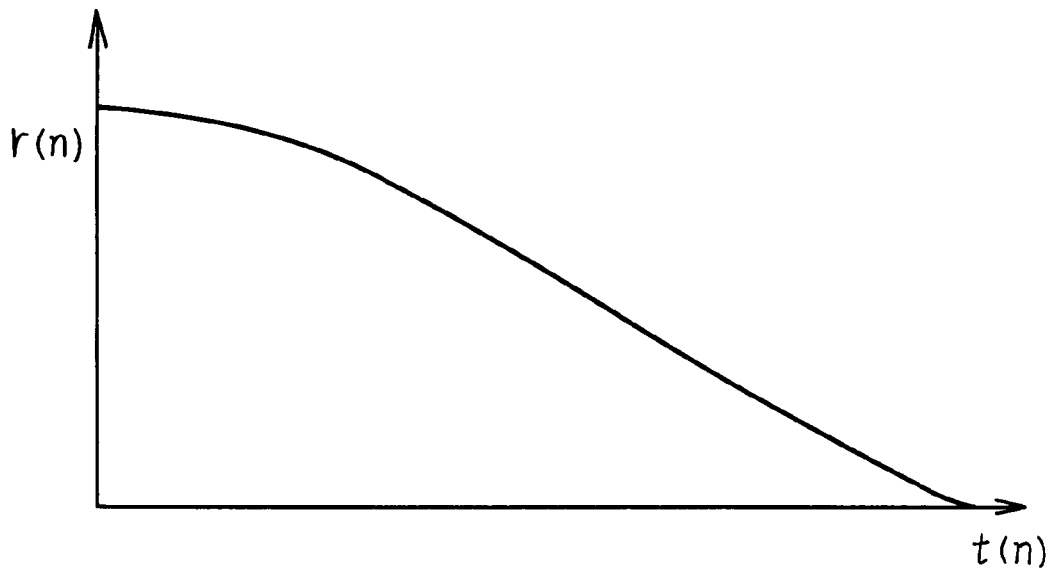
FIG. 16 is a diagram depicting a target position trajectory in FIG. 15.

FIG. 14 is a block diagram depicting the fourth embodiment of the two degree of freedom position control system of the present invention. FIG. 14 shows the configuration of a two degree of freedom control system using double multi-rate control. In FIG. 14, composing elements the same as those in FIG. 5, FIG. 9 and FIG. 10 are denoted with the same reference symbols.

In this multi-rate control, the reference trajectory is r(n+0.5). As the double multi-rate configuration in FIG. 14 shows, a target position (target cylinder) Tp is provided, and seek control starts. A seek distance calculation block 20 calculates the difference between the target position Tp and the current position, so as to acquire the seek distance Lseek.

A target trajectory generation block 22-1 generates a target trajectory r(n) in a sample n and a target trajectory r (n+0.5) in a sample (n+0.5) for each sample according to the seek distance Lseek. For example, as FIG. 11 shows, the target trajectory r(n) is a trajectory of a target position of each sample according to the seek distance Lseek, and r(n+0.5) is a target position trajectory at time advanced by a 0.5 sample from r(n).

A two degree of freedom controller 26-1 is comprised of a multi-rate control current observer shown in FIG. 13. A first computing unit 32-1 subtracts the target position trajectory r(n+0.5) from the target position trajectory r(n) to determine a target position trajectory rd(n) to the controller 26-1. In other words, the target position trajectory rd(n) to the controller 26-1 is a relative value of which reference is the target trajectory r(n+0.5).

A fourth computing unit 32-2 subtracts the target position trajectory r(n+0.5) from the target position trajectory r(n+0.5) to determine the target position trajectory rd(n+0.5) to the controller 26-1. In other words, the target position trajectory rd(n+0.5) to the controller 26-1 is "0" of which reference is the target position trajectory r(n+0.5).

A position error computing unit 30 subtracts the target position Tp from an observation position y(n) of a plant 28 (1, 3) to compute a position error y(n). A second computing unit 34 subtracts the target position trajectory r(n+0.5) from the position error y(n) to determine a position error yd(n) to the controller 26-1.

A delay block 36 delays the target position trajectory r(n+0.5) of the current sample by one sample. A third computing unit 38 adds a value resulting when the target position trajectory r(n+0.5) of the current sample is subtracted from the target position trajectory r(n−0.5) of the previous sample, to the estimated position x(n+1) of the controller 26-1, so as to correct the estimated position x(n+1) of the next sample of the controller 26-1.

In other words, the inputs r(n), r(n+0.5) and y(n) of the multi-rate controller 26-1 are relative values rd(n), rd(n+0.5) and yd(n) of which reference is the target position trajectory r(n+0.5). And the estimated position x(n+1) of the next sample is corrected by the amount of change of the target position trajectory, since the reference is the target position trajectory. In other words, for each sample, the estimated position x(n+1) is corrected by a value resulting when the target position trajectory r(n+0.5) of the current sample is subtracted from the target position trajectory r(n−0.5) of the previous sample.

This reference position is the target position trajectory r(n+0.5) itself, and changes according to the change of the target position trajectory r(n), just like the case in FIG. 11.

In this way, even if the reference position is the target position trajectory r(n+0.5), relative values can be used for inputs to the controller 26, and the controller 26-1 does not have to handle an absolute value, so it is sufficient that the state variable of the observer constituting the controller 26-1 holds a relative distance from the reference position. Therefore the range where the value changes is smaller compared with the case of holding an absolute distance. As a consequence, even if a fixed point method is used, the decimal point can be set at the position of plus 1 bit or plus 2 bits, and calculation accuracy can be improved.

Also it is unnecessary to generate the reference position trajectory in FIG. 5, so this embodiment can be implemented more easily with less computing load.

Other Embodiments

In the above embodiments, the observer control was described using an example of a head positioning device of a magnetic disk device, but the present invention can be applied to other medium storage devices, such as an optical disk device. The disturbance model was considered, but the present invention can also be applied to cases when the disturbance model is not considered.

The present invention was described using the above embodiments, but the present invention can be modified in various ways within the scope of the essential character thereof, and these variant forms shall not be excluded from the scope of the present invention.

For an input of the two degree of freedom control system using an observer, a relative value is used and an absolute value does not have to be handled, so it is sufficient that a state variable of the observer holds a relative distance from a reference position, and a range where the value changes is smaller compared with the case of holding an absolute distance. Therefore the number of effective digits of a decimal point can be increased, and calculation accuracy can be improved, even if a fixed point method is used. As a consequence, a control current becomes smooth and the generation of resonance and noise can be prevented in an acceleration period, and the generation of residual vibration can be prevented in a constant velocity period and deceleration period, and seek time can be decreased.

What is claimed is:

1. A position control method for controlling a position of an object to a target position by an actuator, comprising:
a step of generating a target position trajectory to the target position;
a step of computing a position error based on a target position of the object and a current position of the object; and
a step of computing an output value to the actuator by a two degree of freedom control system which uses an observer, using a relative value of a target position trajectory resulting when a reference trajectory following up the target position trajectory is subtracted from the target position trajectory, and a relative value of a position error when the reference trajectory is subtracted from the position error.

2. The position control method according to claim 1, said method further comprises a step of correcting an estimated position held by the two degree of freedom control system which uses the observer into a relative value from the reference trajectory.

3. The position control method according to claim 1, wherein the output value computing step comprises a step of computing an output value to the actuator using the target position trajectory for the reference trajectory.

4. The position control method according to claim 1, wherein the output computing step comprises a step of computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error, for each sample.

5. The position control method according to claim 1, wherein the output value computing step comprises:
a step of determining a relative value of a target position trajectory by subtracting a reference trajectory following up the target position trajectory from the target position trajectory;
a step of determining a relative value of the position error by subtracting the reference trajectory from the position error; and
a step of computing an output value to the actuator by a two degree of freedom control system which uses an observer, using a relative value of the target position trajectory and a relative value of the position error.

6. The position control method according to claim 1, wherein the step of computing the position error comprises a step of computing a position error between a current position acquired from an output of a head which at least reads data of a storage medium, and a target position for driving the actuator and moving the head to a predetermined position on the storage medium.

7. The position control method according to claim 1, wherein the output value computing step comprises a step of computing an output value to the actuator by a two degree of freedom control system which uses a multi-rate control observer, using a relative value of a first target position trajectory resulting when a reference trajectory following up the target position trajectory is subtracted from the target position trajectory at a sample time, a relative value of a second target position trajectory resulting when the reference trajectory is subtracted from a target position trajectory at the sample time +0.5 sample time, and a relative value of a position error resulting when the reference trajectory is subtracted from the position error.

8. A medium storage device, comprising:
a head for at least reading data on a storage medium;
an actuator for positioning the head to a predetermined position of the storage medium; and
a control unit for generating a target position trajectory to the target position, computing a position error based on a target position of an object and a current position of the object, and computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error.

9. The medium storage device according to claim 8, wherein the control unit corrects an estimated position held by the two degree of freedom control system which uses the observer into a relative value from the reference trajectory.

10. The medium storage device according to claim 8, wherein the control unit computes an output value to the actuator using the target position trajectory for the reference trajectory.

11. The medium storage device according to claim 8, wherein the control unit computes an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error, for each sample.

12. The medium storage device according to claim 8, wherein the control unit determines a relative value of a target position trajectory by subtracting a reference trajectory following up the target position trajectory from the target position trajectory, determines a relative value of the position error by subtracting the reference trajectory from the position error, and computes an output value to the actuator by a two degree of freedom control system which uses an observer, using the relative value of the target position trajectory and the relative value of the position error.

13. The medium storage device according to claim 11, wherein the control unit computes an output value to the actuator by a two degree of freedom control system which uses a multi-rate control observer, using a relative value of a first target position trajectory resulting when a reference trajectory following up the target position trajectory is subtracted from the target position trajectory at a sample time, a relative value of a second target position trajectory resulting when the reference trajectory is subtracted from a target position trajectory at the sample time +0.5 sample time, and a relative value of a position error resulting when the reference trajectory is subtracted from the position error.

14. The medium storage device according to claim 8, wherein the storage medium is a disk storage medium which rotates.

15. A position control device for controlling a position of an object to a target position by an actuator, comprising:
a generation block for generating a target position trajectory to the target position;
an error computing block for computing a position error based on a target position of the object and a current position of the object; and
a control unit for computing an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error.

16. The position control device according to claim 15, wherein the control unit corrects an estimated position held by the two degree of freedom control system which uses the observer into a relative value from the reference trajectory.

17. The position control device according to claim 15, wherein the control unit computes an output value to the actuator using the target position trajectory for the reference trajectory.

18. The position control device according to claim 15, wherein the control unit computes an output value to the actuator by a two degree of freedom control system which uses an observer, using a relative value of a target position trajectory resulting when a reference trajectory following up the target position trajectory is subtracted from the target position trajectory, and a relative value of a position error resulting when the reference trajectory is subtracted from the position error, for each sample.

19. The position control device according to claim 15, wherein the control unit determines a relative value of a target position trajectory by subtracting a reference trajectory following up the target position trajectory from the target position trajectory, determines a relative value of the position error by subtracting the reference trajectory from the position error, and computes an output value to the actuator by a two degree of freedom control system which uses an observer, using the relative value of the target position trajectory and the relative value of the position error.

20. The position control device according to claim 15, wherein the control unit computes an output value to the actuator by a two degree of freedom control system which uses a multi-rate control observer, using a relative value of a first target position trajectory resulting when a reference trajectory following up the target position trajectory is subtracted from the target position trajectory at a sample time, a relative value of a second target position trajectory resulting when the reference trajectory is subtracted from a target position trajectory at the sample time +0.5 sample time, and a relative value of a position error resulting when the reference trajectory is subtracted from the position error.

* * * * *